(12) United States Patent
Hammer et al.

(10) Patent No.: US 11,729,345 B2
(45) Date of Patent: Aug. 15, 2023

(54) DIGITAL ENCODING ALGORITHM FOR PIXELATED DETECTORS

(71) Applicant: UCHICAGO ARGONNE, LLC, Chicago, IL (US)

(72) Inventors: Michael P. Hammer, Westchester, IL (US); Antonino Miceli, Northfield, IL (US); Chris J. Jacobsen, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 215 days.

(21) Appl. No.: 16/887,706

(22) Filed: May 29, 2020

(65) Prior Publication Data
US 2021/0377461 A1 Dec. 2, 2021

(51) Int. Cl.
*G01N 23/201* (2018.01)
*H04N 5/321* (2006.01)
*G01N 23/04* (2018.01)
*G01T 1/17* (2006.01)

(52) U.S. Cl.
CPC ............ *H04N 5/321* (2013.01); *G01N 23/04* (2013.01); *G01T 1/17* (2013.01); *G01N 2223/413* (2013.01)

(58) Field of Classification Search
CPC .......... H04N 5/321; H04N 5/32; H04N 5/378; G01N 23/04; G01N 2223/413; G01N 2223/40; G01N 2223/50; G01T 1/17; G01T 1/2928
USPC ........................................................ 348/162
See application file for complete search history.

(56) References Cited

U.S. PATENT DOCUMENTS

| 9,380,245 | B1* | 6/2016 | Guidash | H04N 5/378 |
| 10,732,301 | B2* | 8/2020 | Scott | A61B 6/54 |
| 2003/0234759 | A1* | 12/2003 | Bergquist | G09G 3/20 |
| | | | | 345/92 |
| 2006/0071170 | A1* | 4/2006 | Broennimann | H01L 27/14661 |
| | | | | 250/370.09 |
| 2007/0075888 | A1* | 4/2007 | Kelly | H04N 5/378 |
| | | | | 341/155 |
| 2011/0260036 | A1* | 10/2011 | Baraniuk | G01T 1/24 |
| | | | | 250/208.1 |
| 2012/0229668 | A1* | 9/2012 | Meyers | H04B 10/70 |
| | | | | 348/222.1 |

(Continued)

OTHER PUBLICATIONS

Allahgholi et al., "AGIPD, a high dynamic range of fast detector for the European XFEL", IOP Publishing for Sissa Medialab, DOI: 10-1088, Jan. 21, 2015.

(Continued)

*Primary Examiner* — Gims S Philippe
(74) *Attorney, Agent, or Firm* — Marshall, Gerstein & Borun LLP

(57) ABSTRACT

A detector for imaging and efficiently digitizing a spatial distribution of photon flux includes pixel circuits that compressively encode pixel values generated by integrated analog to digital converters (ADCs). On-pixel digital compression circuits (DCCs) implement compression to increase continuous frame rate by reducing the number of bits per pixel while keeping quantization error below Poisson noise. Several mapping algorithms for photon-counting and charge-integrating detectors and compact digital logic implementations are presented.

19 Claims, 14 Drawing Sheets

(56) References Cited

U.S. PATENT DOCUMENTS

| | | | | |
|---|---|---|---|---|
| 2012/0280131 | A1* | 11/2012 | Spartiotis | H04N 5/378 |
| | | | | 250/366 |
| 2014/0211058 | A1* | 7/2014 | Nishihara | H04N 5/378 |
| | | | | 348/308 |
| 2015/0131776 | A1* | 5/2015 | Cho | G01N 23/02 |
| | | | | 250/336.1 |
| 2016/0234447 | A1* | 8/2016 | Guidash | H04N 5/378 |
| 2018/0055406 | A1* | 3/2018 | Mandal | A61B 5/369 |

OTHER PUBLICATIONS

Allahgholi et al., "Megapixels @ Megahertz—The AGIPD high-speed cameras for the European XFEL", Nuclear Inst, and Methods in Physics Research, A, 942 (2019) 16234, Jul. 2, 2019.

Amara et al., "FPGA vs. ASIC for low power applications", Microelectronics Journal 37, pp. 669-667. Jan. 31, 2006.

Asanovic et al., "The Rocket Chip Generator", Technical Report No. UCB/EECS-2016-17, Electrical Engineering and Computer Sciences University of California at Berkeley, Apr. 15, 2016.

Bachrach et al., "Chisel:: Constructing Hardware in a Scala Embedded Language", EECS Department, UC Berkeley, pp. 1216-1225, Jun. 2, 2012.

Blackball et al., "Dual scanning and full-field hard x-ray microscopy with a laboratory source", School of Physics, Monash University, Victoria 3800, Australia, vol. 22, No. 13, Jun. 17, 2014.

Bunk et al., "Influence of the overlap parameter on a convergence of the ptychographical iterative engine", Elsevier, ScienceDirect, 108:481-487, Aug. 1, 2007.

Chen et al., "A gigabit transceiver for the ATLAS inner tracker pixel detector readout upgrade", IOP Publishing for Sissa Medialab, DOI 10.1088, Jul. 10, 2019.

Deng et al., "The Velociprobe: An ultrafast hard X-ray nanoprobe for high-resolution ptychographic imaging", Review of Scientific Instruments 90, OI 10/1063/1.5103173, Aug. 15, 2019.

Deng et al., "Continuous motion scan ptychopgrahy: characterization for increased speed in coherent x-ray imaging", Optical Society of America, vol. 23, No. 5, DOI: 10.1364/OE.23.005438, Feb. 23, 2015.

Dierolf et al., "Ptychographic coherent diffractive imaging of weakly scattering specimens", New Jounnal of Physics 12, DOI: 10.1088/1367-2630/12/3/035017, Mar. 31, 2010.

Dierolf et al., "Ptychographic X-ray computer tomography at the nanoscale", Macmillan Publishers Limited, Nature, vol. 467, pp. 436-440, Sep. 23, 2010.

Dinapioli et al., "EIGER: Next generation single photon counting detector for X-ray applications", Nuclear Instruments and Methods in Physics Research A 650, pp. 79-83, Dec. 15, 2010.

Blaj et al., "Performance of ePix10K, a High Dynamic Range Gain Auto-Ranging Pixel Detector for FELs", AIP Conference Proceedings 2054, 060062, Jan. 16, 2019.

Du et al., "Near, far, wherever you are: simulations on the dose efficiency of holographic and ptychographic coherent imaging", Journal of Applied Crystallography, ISSN 1600-5767, 53, pp. 748-759, Apr. 27, 2020.

Eriksson et al., "Diffraction-limited storage rings—a window to the science of tomorrow", Journal of Synchrotron Radiation, ISSN 1600-5775, 21, pp. 837-842, Aug. 28, 2014.

Faulkner et al., "Movable Aperture Lensless Transmission Microscopy: A Novel Phase Retrieval Algorithm", The American Physical Society, The Review Letters, vol. 93, No. 2, Jul. 9, 2004.

Huang et al., "Fly-scan ptychography", Scientific Reports, 5: 9074, DOI: 10.1038/srep09074, Mar. 13, 2015.

Fraser et al., "The X-ray energy response of silicon Part A. Theory", Nuclear Instruments and Methods in Physics Research A 350, pp. 368-378, May 24, 1994.

Garcia-Sciveres et al., "A review of advances in pixel detectors for experiments with high rate and radiation", IOP Publishing, Reports on Progress in Physics, 81, DOI: 10.1088/1361-6633/aab064, May 29, 2018.

Godard et al., "Noise models for low counting rate coherent diffraction imaging", Optical Society of America, vol. 20, No. 23, Nov. 1, 2012.

Hagemann et al., "The fluence-resolution relationship in holographic and coherent diffractive imaging", Journal of Applied Crystallography, ISSN 1600-5767, 50, pp. 531-538, Feb. 23, 2017.

Hart et al., "Development of the LPD, a High Dynamic Range Pixel Detector for the European XFEL", 2012 IEEE Nuclear Science Symposium and Medical Imaging Conference Record, Nov. 16, 2012.

Martin Van Heel, "Similarity Measures Between Images", Ultramicroscopy 21, pp. 95-100, Aug. 27, 1986.

Heel et al., "Fourier shell correlation threshold criteria", Elsevier, Journal of Structural Biology, 151, pp. 250-262, Aug. 8, 2015.

Henrich et al., "The adaptive gain integrating pixel detector AGIPD a detector for the European XFEL", Nuclear Instruments and Methods in Physics Research A, 633, pp. S11-S14, Jun. 17, 2020.

Holden et al., "A color x-ray camera for 2-6 keV using a mass produced back illuminated complementary metal oxide semiconductor sensor", Review of Scientific Instruments 89, 093111, Sep. 20, 2018.

Von Walter Hoppe, "Diffraction in the Inhomogeneous Primary Bea Wage Field I Principle of phase measurement of electron diffraction interferences", Acta Cryst, A25, pp. 495-501, Jul. 29, 1968.

Von Walter Hoppe, "Diffraction in the Inhomogeneous Primary Ray Wave Field III Amplitudes and Phase Determination of Non-Periodic Objects, "Acta Cryst, A25, pp. 508-514, Jul. 29, 1968.

Huang et al., "Signal-to-noise and radiation exposure considerations in convention and diffraction x-ray microscopy", Optical Society of America, vol. 17, No. 16, Jul. 23, 2009.

Huang et al., "Optimization of overlap uniformness for ptychography", Optical Society of America, vol. 22, No. 10, DOI: 10.1364/OE.22.012634, May 16, 2014.

Jahn et al., "How many photons are needed to reconstruct random objects in coherent X-ray diffractive imaging?", Foundations Advances, Acta Cryst, ISSN 2053-5733, pp. 19-29, Sep. 24, 2016.

Loetgering et al., "Data compression strategies for ptychographic diffraction imaging", DE Gruyter, Adv. Opt. Techn. 6)6): 475-483, Aug. 10, 2017.

Maiden et al., "An improved ptychographical phase retrieval algorithm for diffractive imaging", Elsevier, Ultamicroscopy 109, pp. 1256-1262, May 26, 2009.

Masui et al., "A compression scheme for radio data in high performance computing", Elsevier, Astronomy and Computing 12, pp. 181-190, Aug. 5, 2015.

Moreira et al., "The GBT Project", pp. 342-346, Sep. 7, 2007.

Mozzanica et al., "The JUNGFRAU Detector for Applications at Synchrotron Light Sources and XFELs", Synchrotron Radiation News, 31:6, pp. 16-20, Nov. 13, 2018.

Park et al., "Far-Field High-Energy Diffraction Microscopy: A Non-Destructive Tool for Characterizing the Microstructure and Microchemical State of Polycrystalline Materials", Microscopy Today, DOI: 10-1017/S1551929517000827, pp. 36-45, Sep. 2017.

Pelz et al., "On-the-fly scans for X-ray ptychography", Applied Physics Letters 105, 251101, Oct. 5, 2014.

Pezzoli et al., "Characterization of PFM3, a 32x32 readout chip for PixFEL X-ray imager", IEEE Xplore, Dec. 13, 2019.

Phillipp et al., "High-speed x-ray imaging with the Keck pixel array detector (Keck PAD) for time-resolved experiments at synchrotron sources", AIP Conference Proceedings 1741, 040036, Jul. 27, 2016.

Porro et al., "Large Format X-ray Imager with Mega-Frame Readout Capability for ZFEL, based on DEPFET Active Pixel Sensor", 2008 IEEE Nuclear Science Symposium Conference Record, pp. 1578-1586, Nov. 14, 2008.

Robinson et al., "Results of a Prototype Television Bandwidth Compression Scheme", Proceedings of the IEEE, vol. 55, No. 3, Mar. 3, 1967.

Rodenburg et al., "Hard-X-Ray Lensless Imaging of Extended Objects", Physical Review Letters, The Amercian Physical, Society 98, 034801, Jan. 19, 2007.

Saxton et al., "The correlation averaging of a regularly arranged bacterial cell envelope protein", Journal of Microscopy, vol. 127, Pt 2, pp. 127-138, Mar. 11, 1982.

(56) References Cited

OTHER PUBLICATIONS

Schropp et al., "Does requirements for resolving a given feature in an object by coherent x-ray diffraction imaging", New Journal of Physics 12, 035016, Mar. 31, 2010.

Schubert et al., "Micrometre resolution of a charge integrating microstrip detector with single photon sensitivity", Journal of Synchrotron Radiation, ISSN: 0909-0495, 19, pp. 359-365, Jan. 18, 2012.

Shapiro et al., "Chemical composition mapping with nanometre resolution by soft X-ray microscopy", Nature Photonics, vol. 8, DOI: 10.1038/NPHOTON.2014.207, Sep. 7, 2014.

Tate et al., "A Medium-Format, Mixed-Mode Pixel Array Detector for Kilohertz X-ray Imaging", Journal of Physics: Conference Series 425, 062004, 2013.

Thibault et al., "Probe retrieval in ptychographic coherent diffractive imaging", Elsevier, Ultramicroscopy 109, pp. 338-343, Dec. 23, 2008.

Thibault et al., "Reconstructing state mixtures from diffraction measurements", Macmillan Publishers Limited, Nature, vol. 494, pp. 68-71, Feb. 7, 2013.

Trueb et al., "Improved count rate corrections for highest data quality with PILATUS detectors", Journal of Synchrotron Radiation, ISSN: 0909-0495, 19, pp. 347-351, Jan. 30, 2012.

Ueno et al., "Bandwidth Compression of Floating-Point Numerical Data Streams for FPGA-Based High-Performance Computing", ACM Transactions on Reconfigurable Technology and Systems, vol. 10, No. 3, Article 18, May 2017.

Vagovic et al., "High-resolution high-efficiency X-ray imaging system based on the in-line Bragg magnifier and the Medipix detector", Journal of Synchrotron Radiation, ISSN:0909-0495, pp. 153-159, Oct. 25, 2012.

Wakonig et al., "Ptychoshelves, a versatile high-level framework for high-performance analysis of ptychographic data" Journal of Applied Crystallography,, ISSN: 1600-5767, 53, pp. 574-586, Feb. 7, 2020.

Ren et al., "High-Energy Synchrotron X-Ray Diffraction and Its Application In Situ Phase-Transition Studies in Complex Sample Environments", JOM, vol. 64, No. 1, Feb. 9, 2012.

Walter Landauer, "Letters and Preliminary Notices", Nature Ecosystems, Communications from Different Territories, pp. 1212-1213, Dec. 26, 1924.

Zhen-Au Liu, "Proceedings of International Conference on Technology and Instrumentation in Particle Physics 2007", Springer Proceedings in Physics 2013, vol. 213, 2018.

\* cited by examiner

DIGITAL ENCODING ALGORITHM FOR PIXELATED DETECTORS

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure generally relates to imaging detectors and, more particularly, to compressive on-pixel encoding circuits to enable faster frame rates.

BACKGROUND

Imaging detectors enable a wide variety of scientific applications. The detectors include arrays of pixels that collect spatial distribution of photon flux at target optical wavelengths. In particular, imaging X-ray detectors, combined with advanced sources of X-ray illumination, can be applied to better understand complex systems on length scales from atomic to macroscales. As improvements in the speed of X-ray illumination for applications such as scanning microscopy continue, attaining ever-higher frame rates remains a challenge.

An important development in the quest to increase frame rates is integration of high-speed transceivers that can collect data from the detectors to data acquisition systems at rates that reach tens of gigabits per second. Consequently, the bottleneck for fast acquisition of high-resolution data can occur in moving data from the arrays of pixels to the transceiver circuits. Digitization of pixel signals and improvements in digital circuit process technologies offer an opportunity to increase imaging detector frame rates while maintaining high signal quality.

SUMMARY

The techniques described in this disclosure make use of on-pixel digitization of image detector data. Analog-to-digital conversion introduces a quantization error. The effect of quantization, however, becomes significant only when the magnitude of quantization error approaches the magnitude of errors due to other noise sources. In many scientific imaging applications, the major contribution to noise comes from the non-uniform photon arrival statistics, which can be closely modeled by a Poisson process. The so-called Poisson noise varies with signal strength. Therefore, digital pixel data can be encoded with quantization steps that increase as the number of detected photons increases. The resulting encoding, combined with efficient pixel aggregation, forms the basis of the techniques described in this disclosure.

In one embodiment, a detector for imaging and efficiently digitizing a spatial distribution of photon flux comprises a plurality of pixel sensors, wherein each sensor is configured to generate an analog electrical signal indicative of a number of photons detected by the sensor during an integration time interval. The detector further comprises a plurality of pixel circuits corresponding to the plurality of pixel sensors, wherein each pixel circuit includes: (i) an analog-to-digital converter (ADC) configured to generate an M-bit raw digital value based at least in part on the analog electrical signal generated by a corresponding pixel sensor, and (ii) a digital compression circuit (DCC) configured to generate an N-bit compressed digital value, wherein N is smaller than M, based at least in part on the M-bit raw digital value. Still further, the detector comprises a digital processing unit configured to generate a set of frame data by collecting, from each pixel circuit of the plurality of pixel circuits in the detector, the compressed digital value, and one or more transmitters, configured to transmit the set of frame data from the detector within a time interval corresponding to a frame rate.

In another embodiment, a method for imaging and efficiently digitizing a spatial distribution of photon flux using a plurality of pixels comprises generating, for each of the plurality of pixels, using a corresponding pixel sensor, an analog electrical signal indicative of a number of photons detected by the corresponding pixel sensor during an integration time interval. The method further comprises generating, for the each of the plurality of pixels, using a corresponding analog-to-digital converter (ADC), an M-bit raw digital value based at least in part on the analog electrical signal. Still further, the method comprises generating, for the each of the plurality of pixels, using a corresponding digital compression circuit (DCC), an N-bit compressed digital value, wherein N is smaller than M, based at least in part on the M-bit raw digital value. And still further, the method comprises generating, using a digital processing unit, a set of frame data by collecting, from the each of the plurality of pixels in the detector, the compressed digital value, and transmitting, using one or more transmitters, the set of frame data from the detector within a time interval corresponding to a frame rate.

DETAILED DESCRIPTION

Analog-to-digital conversion introduces quantization errors which can be referred to as quantization noise. Generally, the effect of quantization noise can be minimized by making quantization steps less than or equal to the average noise magnitude in the signal before quantization. In sensitive optical detectors, amount of noise before quantization may increase with the amplitude of the detected signal, following a so-called Poisson distribution that describes photon arrival statistics. One approach to keeping quantization noise aligned with the amplitude-dependent noise of the pre-quantization signal is by using an analog-to-digital converter (ADC) with non-uniform quantization steps. A more versatile approach disclosed herein, on the other hand, assumes uniform quantization steps in the ADC and introduces an on-pixel digital compression circuit (DCC) to encode digital pixel output of a detector by remapping the ADC output to a digital signal with the amplitude-dependent quantization step. That is, as the signal increases, the DCC increases the effective quantization error to efficiently encode the signal. The compressive encoding can be optional because the DCC can be bypassed in some implementations. The DCC can be efficiently implemented, as described here, in digital logic circuits with small footprints and low power consumption. All or portions of detector circuits may be implemented as an application-specific integrated circuit (ASIC). The ASIC may be implemented in complementary metal-oxide-semiconductor (CMOS) technology using a suitable resolution of lithography.

I. Structure of Detector

Figure 1:
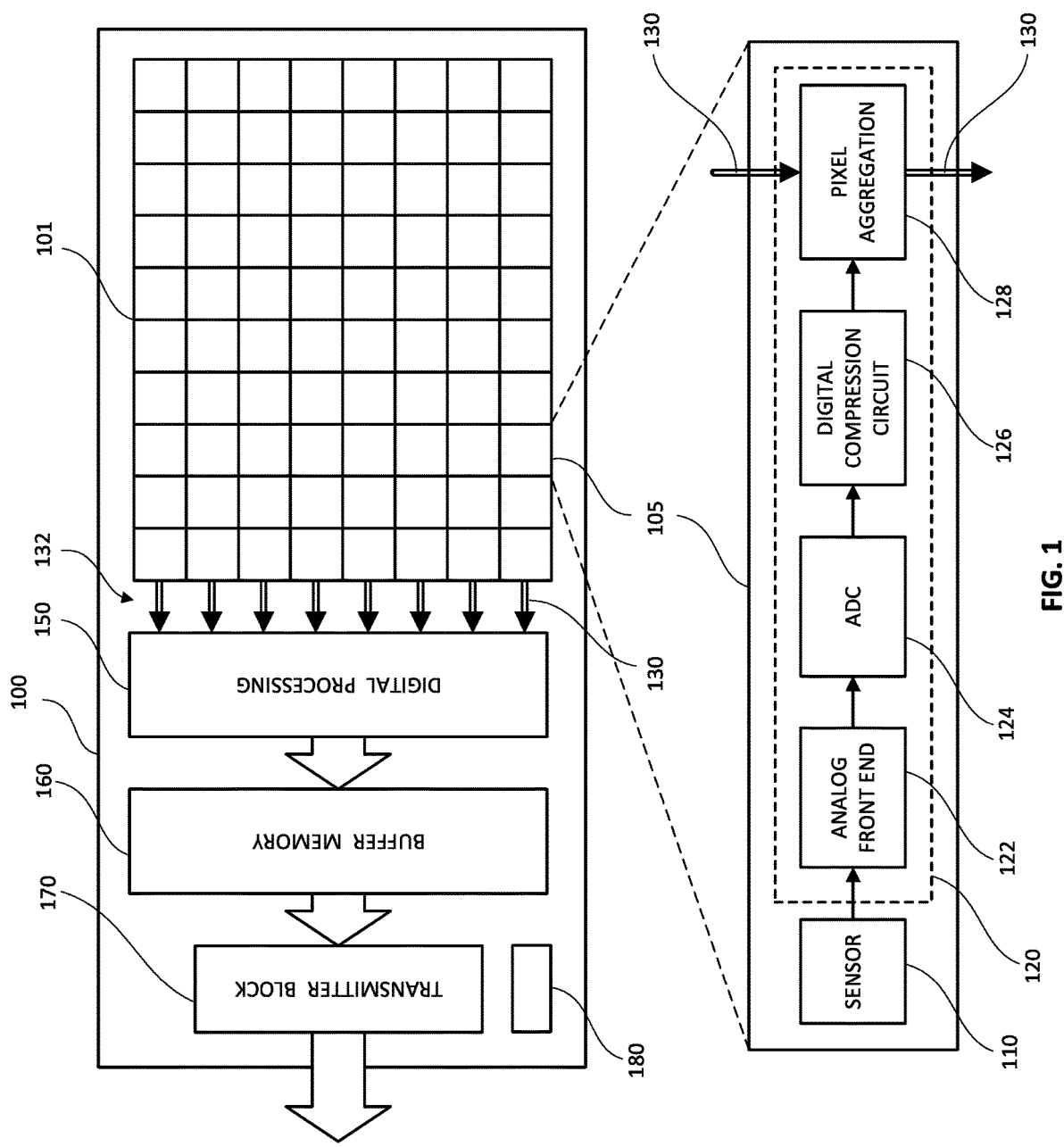
FIG. 1 schematically illustrates an example imaging detector that includes an array of pixels and also illustrates a detailed view of functional components of an individual pixel within the array of the detector.

FIG. 1 schematically illustrates an example detector 100 for imaging and efficiently digitizing a spatial distribution of photon flux. The detector includes an array 101 of pixels (e.g., pixel 105). A blow-out view, indicated by dashed lines, schematically illustrates components 110-128 of an example individual pixel 105. Each pixel in the array 101 may have substantially identical components to the components 110-128 of the example pixel 105.

The pixel 105 may include a sensor 110 configured to generate an analog electrical signal indicative of a number of photons detected by the sensor during an integration time interval. The pixel 105 may further include, in electrical connection with the sensor 110, a pixel circuit 120 configured to convert the analog electrical signal generated by the sensor 110 into a digital value represented by a plurality of bits. To that end, the pixel circuit 120 may include, in electrical connection with each other, an analog front end 122, an analog-to-digital converter 124, a digital compression circuit 126, and a pixel aggregation circuit 128.

The pixel aggregation circuit 128 may be communicatively connected to a pixel aggregation bus 130, which may be referred to as an aggregation bus or, simply, a bus. The bus 130 may be one of a set 132 of busses, collectively configured to facilitate collecting digital values from every pixel in the array 101.

The bus 130 may include one or more conductive traces (e.g., copper, gold, other metals, etc.) in a circuit board or in an integrated circuit. Additionally or alternatively, the bus 130 may include one or more optical waveguides.

The bus 130, along with other busses in the set 132, may be communicatively connected to a digital processing unit 150. The set 132 of busses (including bus 130) and the digital processing unit 150 may cooperatively form at least a portion of a read-out circuit configured to generate a set of frame data based on digital values generated by each pixel circuit (e.g., pixel circuit 120) in the array 101. In a sense, the read out circuit may include the digital processing unit 150, the set of busses 132, and portions of each pixel circuit (e.g., pixel circuit 120).

The digital processing unit 150 may include a portion of an ASIC, an FPGA, a digital signal processor, and/or any other suitable processing hardware. For example, in a detector-on-a-chip configuration, the digital processing unit may be a portion of an ASIC distinct from the pixel circuits, but implemented on the same substrate using CMOS technology. The digital processing unit 150 may include digital memory.

The digital processing unit 150 may be communicatively connected to buffer memory 160. The buffer memory may, in turn, be communicatively connected to a transmitter unit 170, which may include one or more high-speed transmitters. The one or more high-speed transmitters may be configured to transmit the set of frame data from the detector 100 to an external (outside of the detector) data acquisition (DAQ) module or system. In some implementations, the read-out circuit may be connected directly to the transmitter unit 170, without channeling the frame data through the buffer memory 160.

The communicative connection between the detector 100 and the DAQ may be a wired electrical connection, a wireless connection, a fiber-optic or a free space optical connection. Thus, the transmitter unit 170 may include one or more high-speed electronic, radio, or optical transmitters. The one or more transmitters may be, for example, gigabit Ethernet transmitters. A suitable number of transmitters (e.g., 2, 4, 8, 12, 16, etc.) may be used in parallel to increase the total bandwidth of the transmitter unit 170.

The buffer memory 160 and/or memory in the digital processing unit 150 may include random access memory (RAM), read-only memory (ROM), electrically-erasable programmable ROM (EEPROM), flash memory, etc.

The transmitter unit 170 may include wired or wireless, electronic, optoelectronic, and/or optical components. The transmitter unit may 170 include peripheral component interconnect (PCI), PCI Express, Ethernet, Wi Fi, Bluetooth or any other suitable transceivers.

The detector 100 may include a control circuit 180. The control circuit 180 may be in communicative connection (not shown to avoid clutter) with the pixels (e.g., the pixel 105) within the array 101, as well as the digital processing unit 150, the buffer memory 160, and the transmitter unit 170. The control circuit 180 may be configured to control the sequence of events associated with operating the detector 100. To that end, the control circuit 180 may include a clock and one or more circuits to generate one or more triggering signals. In some implementations, the control circuit 180 may be outside of the detector. Additionally or alternatively, the clock or at least a portion of the clock (e.g., a quartz crystal, etc.) may be outside of, but in communicative connection with, the control circuit 170. The control circuit 180 may be configured to distribute the clock signal in the detector 100 with suitable delays.

In one implementation, the control circuit 180 of the detector 100 initiates the read-out with a frame synchronization (frame sync) signal. In another implementation, the frame sync signal may be transmitted to the detector 100 from an external circuit.

The detector 100 may include power circuitry (not shown to avoid clutter), configured to distribute power from a power source among the various components of the detector 100. Furthermore, the detector 100 may include one or more sensors in addition to the sensors in the array 101 of pixels and/or one or more communication interfaces in addition to the transmitter unit 170.

At least some of the components of the detector 100 may be implemented as an application-specific integrated circuit (ASIC) or a system on a chip (SoC).

II. Pixels in the Array of the Detector

The array 101 of pixels of the detector 101 is illustrated in FIG. 1 with 80 pixels arranged in eight rows and ten columns. In some implementations, the array 101 may have 100, 200, 500, 1000, 2000 or any other suitable number of rows and 100, 200, 500, 1000, 2000 or any other suitable number of columns of pixels. A number of row, columns, and/or total number of pixels may be a power of two. For example, a one-megapixel array 101 may include a 1024× 1024 rectangular array of pixels. Furthermore, the array 110 need not be rectangular. The array 101 may be formed in a hexagonal grid or any other suitable arrangement of pixels.

The pixels (e.g. pixel 105) may include photodiodes, phototransistors, charge-coupled-devices (CCDs), complementary metal oxide semiconductor (CMOS) devices, or any other suitable devices. The choice of device type may depend on required wavelength of detection, speed, sensitivity, noise properties, need for cooling, reliability, cost, etc.

The sensor 110 may be configured to detect photons within a range of wavelengths, or, in some implementations, within multiple ranges of wavelengths. The sensor may be configured to detect photons in a far-infrared, mid-infrared, near-infrared, visible, ultra-violet, X-ray, or Gamma ray wavelength region, for example. To that end, the sensor 110 may include an active region configured to absorb impinging photons to generate mobile electrons, electron-hole pairs, or lattice vibrations that can result in an electrical signal. In some implementations, the sensor 110 may include a layer (e.g., of scintillating material) to convert impinging photons into secondary photons (e.g., of different wavelengths) before absorbing the secondary photons to generate electrical signals.

The sensor may also include an integrated filter layer (e.g., an interference or an absorption coating) preceding the active region to further restrict the wavelength range to which the sensor responds. Additionally or alternatively, front-end optics (e.g., a grating, a prism, etc.) may select the wavelength range impinging on the sensor.

The active region of the sensor 110 may include metal or semiconductor materials fabricated into thin film, thick film, or other suitable structures. In some implementations, the sensor 110 may be fabricated (e.g., using semiconductor or other thin or thick film processing techniques) on the same substrate as at least a portion of the pixel circuit 120. In other implementations, the sensor 110 may be fabricated on a separate substrate and bonded together with the circuit 120 using, for example, solder bumps. Such a configuration may be referred to as a hybrid pixel configuration. In some implementations, a full array of sensors (e.g., sensor 110) may be fabricated on one substrate and bonded onto a full array of circuits (e.g., circuit 120) to form the pixel array 101.

III. Operation of Detector

In operation, the detector 100 may convert a spatial distribution of photon flux impinging on the array 101 of pixels into a new set of frame data, or, simply, a frame, for every time interval, $T_f$, corresponding to a frame rate, $R_f=1/T_f$. In some implementations, on the other hand, the frame rate may be an average frame rate corresponding to a time interval for generating an integer number, N, of frames. That is, $R_f=N/(T_{f1}+T_{f2}+\ldots+T_{fN})$. A frame rate may be sustained as a continuous frame rate if the transmitter unit 170 of the detector 100 can transmit the frame data at the same average rate that the digital processing unit 150 assembles the frames.

In an example continuous operation mode, for every time interval, $T_f$, the detector 100 may: i) integrate the photon flux for an integration time no greater than $T_f$ to generate analog values at every pixel sensor (e.g., sensor 110), ii) convert analog values into compressed digital values using pixel circuits (e.g., pixel circuit 110), iii) transfer digital pixel values to the digital processing unit 150 using the set 132 of busses (e.g., aggregation bus 130), iv) generate a new frame using the digital processing unit 150, and v) transmit a frame to a data acquisition system using the transmitter unit 170. The actions (i)-(v), are referred to below as the five steps of generating a frame. These steps, when completed within the same time interval, $T_f$, may be associated with distinct frames. In other words, while the digital processing unit 150 is generating a frame with index n, the pixel circuit 120, along with other pixel circuits in the array 101, may be digitizing the data for the following frame, with index n+1. During the same time interval, the sensor 110, along with other pixel sensors in the array 101, may be integrating the photon flux for yet the next frame, with the index n+1. Still during the same time interval, the transmitter unit 170 may be transmitting to the data acquisition system, an earlier frame with the index n−k, where k is an integer delay (e.g., 0, 1, 2, 4, . . . 4096, or any other suitable integer) that depends on the configuration and state of the buffer memory 160. The time delay between the generation of the analog values by the sensors of the array 101 and the transmission of frame data by the transmitter unit 170 may be any suitable time delay and need not be an integer multiple of $T_f$.

In some implementations, the digital processing unit 150 may be configured to generate partial frames (e.g., by including values collected from a subset of pixels in the array 101) and/or aggregate multiple frames or partial frames into super-frames corresponding to more than a single time interval, $T_f$. The transmitter unit 170 may transmit super-frames or partial frames, for example, to reduce or better manage the average bandwidth of the data generated by the detector.

The pixel aggregation bus 130 may collect digital values from a plurality of pixels, such as all pixels in the same row of the array 101, or any other suitable collection of pixels (e.g., a column, a rectangular array segment, etc.). Pixel aggregation circuits (e.g., the aggregation circuit 128) may transfer bits generated by corresponding pixel circuits (e.g., the pixel circuit 120) onto the set 132 of aggregation busses in response to a signal from a control circuit 180.

IV. Generating a New Frame

In the first step of generating a new frame, an impinging photon may interact with an active region of the sensor 110 to produce an electrical signal. In generating the analog electrical signal, the sensor 110 may act as a voltage source or a current source.

In some implementations, the sensor 110 may generate a current pulse for every absorbed photon. The analog front end 122 may include an amplifier, a pulse-shaper, and a comparator. The comparator may return a binary value, indicating whether the total charge in the current pulse exceeded a threshold value. In some implementations, different thresholds may differentiate between energies of absorbed photons, forming a basis for a spectrally-sensitive response. The output of the comparator may serve as an input to a counter, configured to increment a digital value at the output of the counter for every detected pulse. The counter may be configured with any suitable number (e.g., 8, 9, 10, 12, 14, etc.) of bits implemented, for example, as cascaded flip-flops. Thus, the output of the comparator in cooperation with the counter may act as the ADC 124, and the sequence of the cascaded flip-flops of the counter may serve as an ADC output register. The counter may be reset to zero for every frame. Such implementations, in which the sensor 110 and the circuit 120 cooperate in counting current pulses generated by absorbed photons, may be referred to as photon-counting implementations, and the detector 100 may be referred to a photon-counting detector. The time interval during which the counter is allowed to continuously increase may be referred to as the integration time for the photon-counting implementations.

In other implementations, the pixel 105 may accumulate charges generated by absorption of photons for a time interval that encompasses a plurality of photon absorption events. The sensor 110 may accumulate and store charge, for example, confined within a potential well or within built-in capacitance. Additionally or alternatively, one or more capacitive elements of the analog front end 122 may store accumulated charge. The detectors, in which charge generated by absorption of photons during an integration time interval is accumulated at either the sensor 110 or the analog front end 122 of the pixel circuit 120, may be referred to as charge-integrating detectors.

The analog front end 122 may include amplifiers with gain relating the amount of stored charge and/or voltage to the number of absorbed photons. The gain may be changeable, and the analog front end 122 to accommodate different levels of photon flux. The output of the analog front end 122 may be voltage that continues to increase until it is reset, for example, by discharging the capacitive elements. A switch (e.g., a transistor) may activate, for example in response to a new frame signal from the control circuit 180, to provide a path to ground to reset the voltage output of the analog front end 122.

In some implementations, the integration time for the charge-integrating detector may refer to the time interval during which the voltage output of the analog front end 122 can accumulate before being reset. In other implementations, the integration time for the charge-integrating detector may refer to the time during which charge accumulates on the sensor 110.

In the second step of generating a new frame, the pixel 105 generates a digital value indicative of the number of photons in the spectral region of detection that impinge on the sensor during the integration time. In some implementations, the pixel circuit 120 is configured to generate the digital value during the frame time interval during which the corresponding photon flux is integrated. In other implementations, the pixel circuit 120 is configured to digitize the analog signal generated during a previous frame time interval.

The ADC 124 may digitize the voltage output of the analog front end 122 into 8, 9, 10, 12, 14 or any other suitable number of bits and store the output in a register that may be referred to as the ADC output register. Some register locations may be reserved for bits indicating the gain of the analog front end 122. For example, up to four of the analog front end 122 gain ranges may be encoded with two bits within the register. The bits encoding the gain ranges can be thought of as part of the ADC 124 output. For example, in some implementations, the 14-bit ADC 124 may encode the gain as the first two most significant bits, with 11 representing the lowest of four gains (used when the photon flux is highest) and 00 representing the highest gain (used when the photon flux is lowest). The remaining 12 bits may then encode the voltage level at the output of the analog front end 122 at the time of read-out, e.g., the end of integration time. The resulting 14-bit digital value may be indicative of the number of photons detected by the sensor during the integration time interval. The switchable gain may be configured so that there is a substantially uniform mapping between the number of detected photons and the digital value generated by the ADC 124.

Whether the detector is a photon-counting detector or a charge-integrating detector, the output of the ADC is a digital value represented by certain number of bits. Larger digital values may represent higher numbers of photons detected during the integration time. The number of detected photons, however, may not always precisely represent the photon flux. For example, with a constant photon flux of 100 photons per pixel per microsecond, most of the microseconds may result in anywhere between 90 to 110 photons detected, with values outside of this range possible, and values closer to 100 more likely. These arrival statistics of photons follows a so-called Poisson distribution, and is a source of noise in the detected signal.

The digital output of the ADC 124 may be configured to increase by one for any set number of detected photons—one photon in the photon-counting mode, or another number, depending on the gain regime, in the charge integrating mode. The noise associated with the detected number of photons, on the other hand, varied with the detected number according to the Poisson statistics described above. Consequently, larger digital outputs of the ADC 124 may carry larger uncertainties. That is, while an increase from the value of 3 to 5 is likely to be due to increased photon flux, the increase from the value of 103 to 105 is indistinguishable from noise. Thus, for larger ADC outputs, each additional bit-size increase carries less and less information.

The digital compression circuit 126 (DCC) following the ADC 124 can decrease the number of bits used to represent the digital output of the pixel 105 and to increase the amount of information carried by each step in digital value. To that end, the DCC 126 may remap the digital value at the input to the DCC 126, represented by M bits produced by the ADC 124, into an N-bit digital value at the output of the DCC 126, such that N is less than M. The mapping, discussed below in some detail with reference to an example FIG. 2, may be such that the N-bit digital value at the output of the DCC 126 maintains most information in comparison to the M-bit digital value at the output of the ADC 124.

The value of M may be 8, 9, 10, 12, 14 or any other suitable integer. The corresponding value of N may be lower by 1, 2, 3, 5 or any other suitable number of bits. In one example, a 14-bit value (M=14) at the output of the ADC 124 may be remapped to a 9-bit value (N=9) at the output of the DCC 126.

The reduction from M bits to N bits, i.e., on-pixel compression performed by the DCC 126, may improve the frame rate achievable by the detector 100 under continuous operation. Additionally or alternatively, the on-pixel compression may reduce the circuit real estate that needs to be allocated to the bus 130, as described in more detail below, for example, with reference to FIG. 15.

A circuit implementing the DCC 126 may compute an N-bit value based on an M-bit value using, for example, logic circuits described below. Additionally or alternatively, the DCC 126 may use a look-up table to determine the N-bit value based on the M-bit value generated by the ADC 124. In some implementations, the look up table may be implemented outside of the DCC 126 and shared by multiple pixel circuits.

In some implementations, the DCC 126 may map to zero outputs of the ADC 124 that fall below a threshold value. This operation may be referred to as "de-noising," and may simplify further compression of the frame data (e.g., by the digital processing unit 150). For example, the outputs of the ADC 124 below threshold values may indicate a high likelihood that no photons were detected during the integration time. Instead, the voltage digitized by the ADC 124 may be indicative of noise generated in the analog front end 122 of the circuit 120, particularly when the circuit 120 is in a high-gain regime. The threshold value may be unique to each pixel (e.g., pixel 105) within the array 101, and each corresponding pixel circuit (e.g., circuit 120) may include a register for storing the corresponding threshold value. The threshold values may be obtained during calibrating the detector 100, particularly with a so-called dark-field or dark-frame calibration. In some implementations, threshold values may be set to values that correspond to detecting a non-zero number of photons.

The DCC may store the N-bit digital value in a storage register included in the pixel circuit 120. In some implementations, the pixel circuit 120 may include multiple N-bit storage registers to store N-bit values for multiple consecutive frames. The digital values may be transferred out of the storage registers using the pixel aggregation circuit 128. The pixel aggregation circuit 128 may transfer data corresponding to multiple frames in parallel using the bus 130.

The transfer of digital values from the pixels (e.g., pixel 105) of the array 101 to the digital processing unit 150 is the third step of generating a frame and may be referred to as the array read-out. The array read-out, depending on implementation, may be a time-limiting step in the continuous operation of the detector 100. That is, the frame rate in continuous operation may depend on how fast the digital processing unit 150 can receive the digital data from all of the pixels in the array 101.

Figure 11:
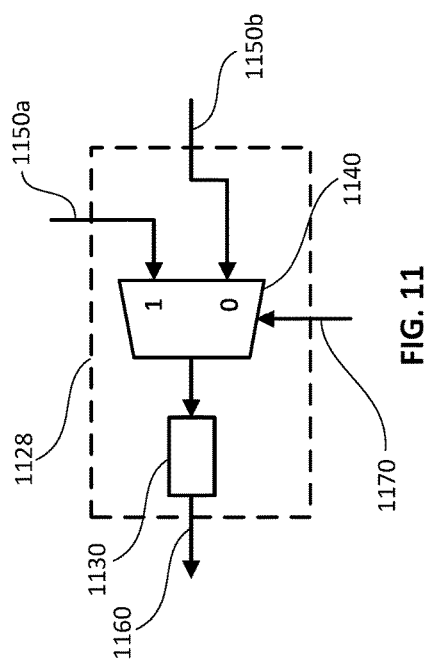
FIG. 11 schematically illustrates an example pixel aggregation circuit.

As described in more detail below, with reference to FIGS. 11-13, array read out may include transferring digital values from one pixel to another via the bus 130. Each transfer may take one clock cycle. During each clock cycle, a portion of the pixels may transfer their values to the digital processing unit. As schematically illustrated in FIG. 1, for example, the column of eight pixels adjacent to the digital processing unit 150 may transfer, during the first clock cycle of the frame read-out, their values to the digital processing unit 150. During the same clock cycle, the values transferred to the digital processing unit 150 may be replaced by the values from the column adjacent on the right. Thus, clock cycle by clock cycle, and column by column, the array 101 may be read out in as many clock cycles as there are columns in the array 101.

The fourth step of generating a frame includes assembling of the frame by the digital processing unit 150. The frame assembly process may include digital signal processing, such as linear and/or nonlinear (e.g., smoothing, median, etc.) filtering in one or two dimensions, as well as one or more compression algorithms. For example, the processing unit 150 may include lossless compression using run-length codes to exploit neighboring zero-pixels. In some implementations, the digital processing unit 150 may use image compression algorithms such as GIF, TIFF, LZ4, or any other suitable algorithms. Additionally or alternatively, the digital processing unit 150 may implement compression algorithms based on artificial intelligence (AI) and machine-learning (ML). The compression implemented at the digital processing unit 150 may be referred to as edge compression, in contrast to pixel compression implemented at the pixel circuits (e.g., the DCC 124).

The frame assembly process may also append additional information to at least some of the frames, such as a header with detector settings (e.g., frame rate, pixel compression, edge compression, etc.). Additionally or alternatively, the digital processing unit 150 may implement channel coding on the frames to facilitate error detection and/or correction that may occur in transmission.

The fifth step of generating a frame is transmitting, by the transmitter unit 170, the frame data from the detector 100 to an external data acquisition (DAQ) module or system. The process may include rearranging the bits of the frames generated by the digital processing unit 150 into communication frames suitable for transmission. The information payload of the detector data may be augmented by additional bits as described above. The transmitter unit 170 may then modulate the communication data frames onto a physical waveform and transmit the waveform over the suitable link (e.g., copper cable, optical cable, air) to the DAQ.

V. Example Encoding of Pixel Value

Figure 2:
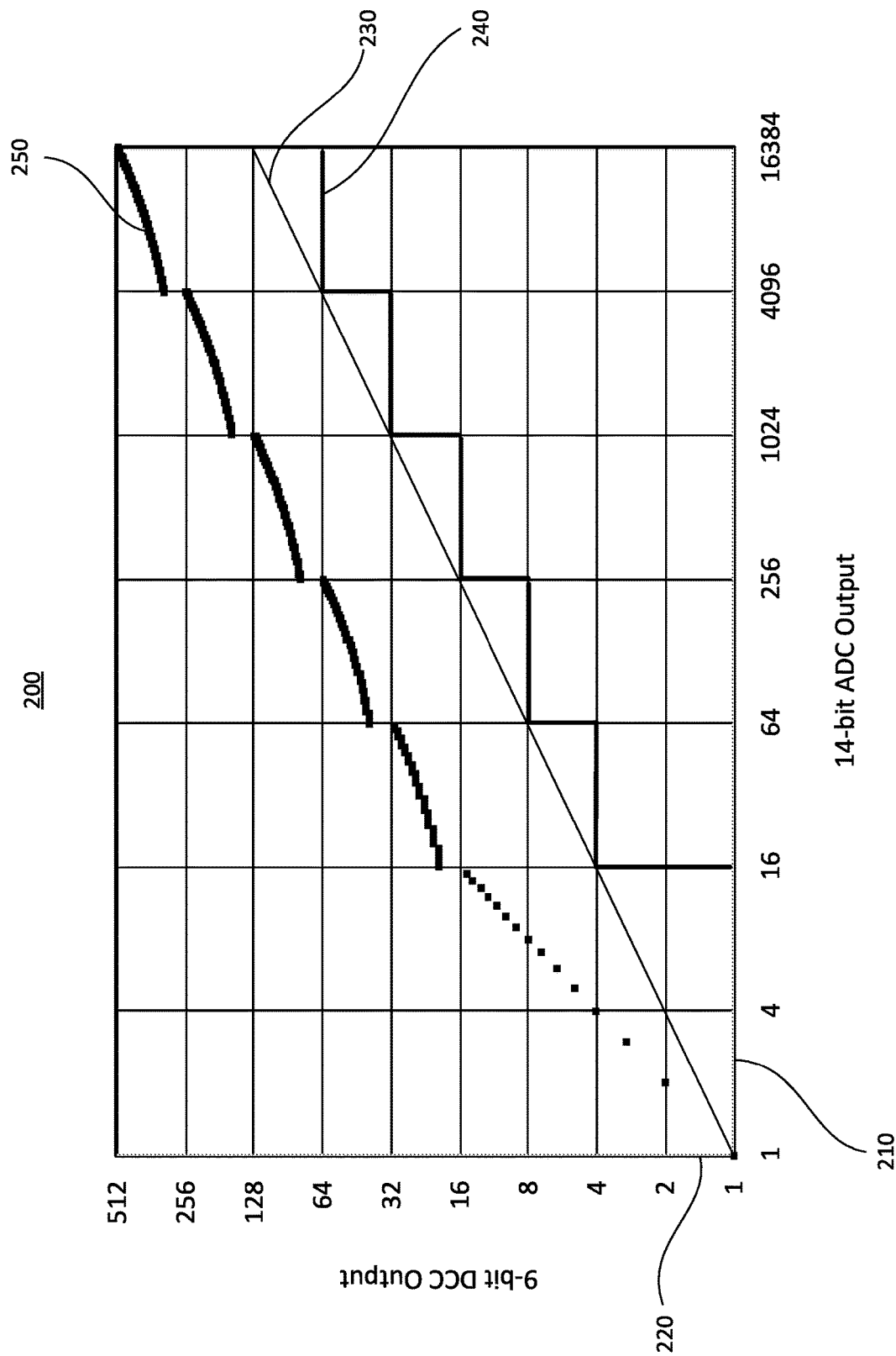
FIG. 2 is a chart of an example mapping of a digital pixel value used to compressively encode a 14-bit output as a 9-bit output.

FIG. 2 is a chart 200 of an example encoding or mapping of a digital pixel value from a 14-bit output of an ADC (e.g. ADC 124) to a 9-bit output of a pixel DCC (e.g., DCC 126). The example encoding compresses the ADC data by allowing the majority of DCC outputs to represent multiple DCC inputs (i.e., ADC outputs). In a sense, the resulting compressive encoding re-quantizes pixel data from the ADC with a variable quantization step. The compression of the mapping preserves most of the information, because the output of the ADC representation of the spatial distribution of the photon flux is inherently noisy due to photon arrival statistics, known as Poisson noise. The quantization noise introduced by the remapping is no larger than the Poisson noise of the detected photon flux. The particular remapping illustrated in FIG. 2 is advantageous because it can be implemented with simple digital logic, preserving chip and/or circuit board real estate.

In some implementations, the quantization noise (e.g., noise after the re-quantization by the DCC) may be allowed to exceed the Poisson noise. For example, ADC values above a certain threshold may be truncated, i.e. set to the maximum output. Generally, for some ranges of ADC output values the quantization noise of DCC output may be allowed to exceed Poisson noise, while for other ranges of the ADC output values the DCC may be configured to keep quantization noise below the Poisson noise.

In the chart 200, the x-axis 210 represents the 14-bit digital value, and the y-axis 220 represents the 9-bit digital value to which a given 14-bit value maps. The scales of both axes are logarithmic with even powers of 2 ($2^0=1$, $2^2=4$, $2^4=16$, ..., $2^{14}=16384$) marking vertical gridlines, and powers of 2 (1, 2, 4, ..., 512) marking horizontal grid lines.

In the example, the values on the x-axis may represent photon count. In other implementations, the 14-bit value may be indicative of, but not equal to, photon count. For example, for charge-integrating detectors, a gain in an analog front end (e.g., analog front end 122) may determine the relationship between photon count and the digital value generated by the ADC. It may be convenient, though, to set up the gain of the analog front end and the quantization levels of the ADC so that the ADC output represents the photon count closely, as in the present example.

In the example, since the values on the x-axis represent photon count, the Poisson noise line 230, or simply, noise line, represents estimated photon arrival noise. The photon count generally follows the Poisson statistical distribution, with the mean of average photon flux multiplied by the integration time and variance equal to the meant count. Thus, the standard deviation is the square root of the mean. The noise line 230 is an estimate of the Poisson noise as a function of the detected photon count, because the detected photon count is the estimated mean (i.e., not necessarily the actual mean) of the integrated photon flux. In any case, as the detected photon count increases, so does the associated noise. Therefore, the DCC may decrease quantization precision for increasing digital output without incurring a substantial loss in the resulting signal-to-noise ratio, as long as the of the re-quantization step does not substantially exceed the Poisson noise amplitude.

The re-quantization step line 240 represents the number of outputs of the ADC that map to the same output of the DDC as a function of the ADC output. The mapping function 250 represents the example DDC outputs as a function of the ADC outputs. The mapping function 250 represents one possible mapping consistent with the re-quantization step line 240. The mapping function 250 is discontinuous, having gaps in the range following each transition to a new quantization step size. Though the gaps result in expanding the range of the mapping function 250, the gaps enable simplifying the corresponding implementation of the mapping in digital logic.

Table I aids in describing the example mapping function 250. When the output of the ADC is zero, the output of the DCC is also zero. The origin point of the mapping function 250 is not represented on the chart 200 because the axes are logarithmic. In the first region of the mapping displayed on the chart 200, the re-quantization step is one (1), and, consequently, the ADC outputs of 1 through 15 map onto identical outputs of the DCC. In another implementation, the re-quantization step of 2 may be used for ADC outputs of 4-15, while keeping quantization noise nominally below the Poisson noise. In the second region, the re-quantization step is four, and the ADC outputs of 16-63 map onto the DCC outputs of 20-31. In the third region, the re-quantization step is eight, and the ADC outputs of 64-255 map onto the DCC outputs of 40-63. In the fourth region, the re-quantization step is 16, and the ADC outputs of 256-1023 map onto the DCC outputs of 80-127. In the fifth region, the re-quantization step is 32, and the ADC outputs of 1024-4095 map onto the DCC outputs of 160-255. In the sixth region, the re-quantization step is 64, and the ADC outputs of 4096-16383 map onto the DCC outputs of 320-511. Thus, in the example mapping function 250, the DCC output takes one of 388 out of the 512 available 9-bit values.

| Region | In: ADC Output | # Photons | Est. Noise | DCC Step | Conversion Formula | Out: DCC Output |
|---|---|---|---|---|---|---|
| 1 | 0-15 | 0-15 | 0-4 | 1 | R = [P/1] + 0 | 0-15 |
| 2 | 16-63 | 16-63 | 4-8 | 4 | R = [P/4] + 16 | 20-31 |
| 3 | 64-255 | 64-255 | 8-16 | 8 | R = [P/8] + 32 | 40-63 |
| 4 | 256-1023 | 256-1023 | 16-32 | 16 | R = [P/16] + 64 | 80-127 |
| 5 | 1024-4095 | 1024-4095 | 32-64 | 32 | R = [P/32] + 128 | 160-255 |
| 6 | 4096-16383 | 4096-16383 | 64-128 | 64 | R = [P/64] + 256 | 320-511 |

VI. Block Diagram for Implementing Example Mapping

Figure 3:
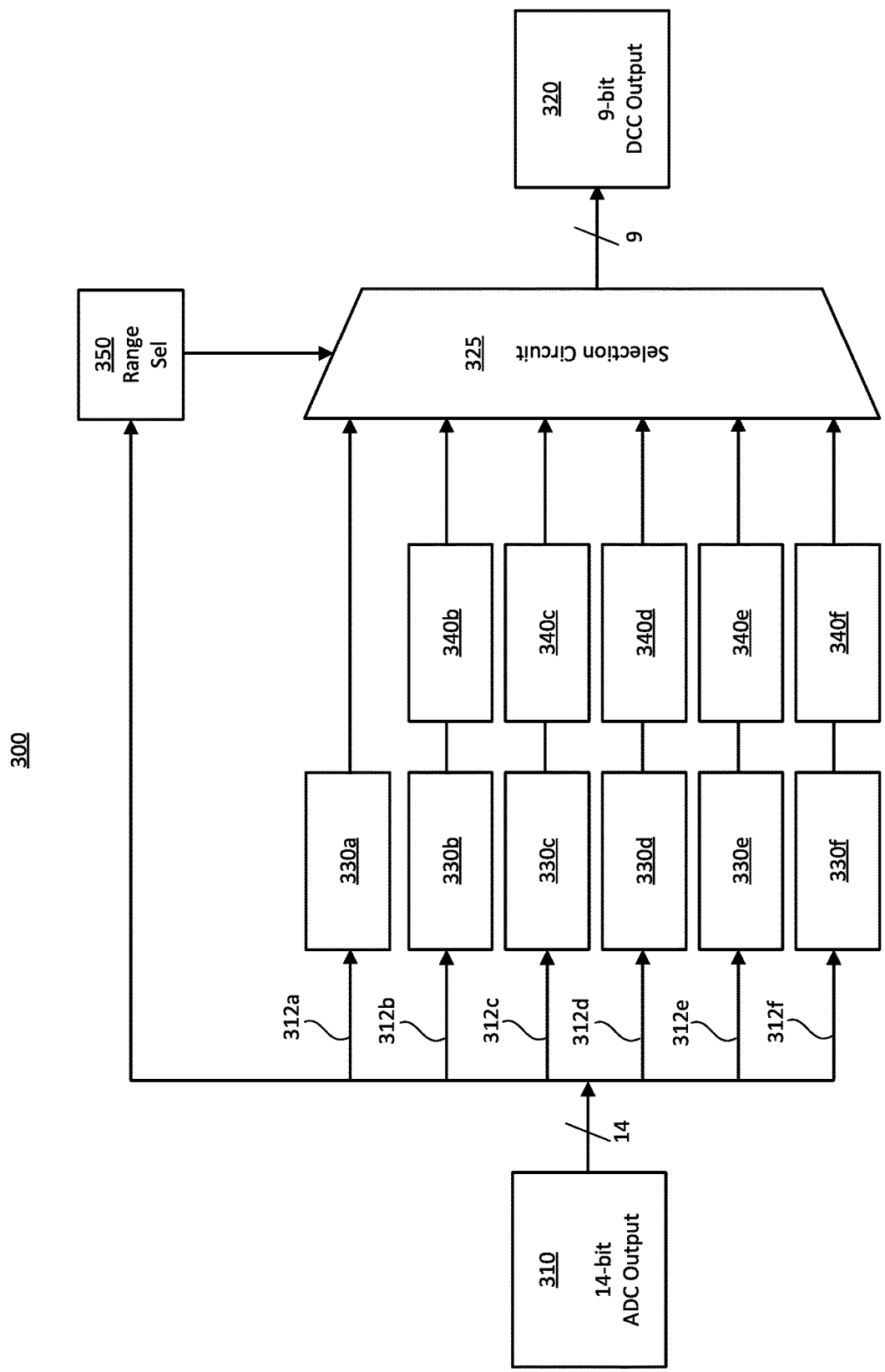
FIG. 3 is a block diagram of an example logical implementation of at least a portion of a digital compression circuit that implements the mapping illustrated in FIG. 2.

FIG. 3 is a block diagram of an example logical implementation 300 of a DCC (e.g, the DCC 126) that implements the mapping function 250 in FIG. 2. In the example implementation 300, the 14-bit ADC output 310 splits into six logical paths 312a-f that represent, respectively, the regions 1-6 of the mapping function 250. The DCC may implement the ADC output 310, for example, as a register, a shift register, or, simply, as a set of traces connected to an output register in the ADC. The logical paths 312a-f represent the six possibilities or choices of mapping the 14-bits of the ADC output 310 into 9-bits of the DCC output 320. When referencing specific bits in the discussion below, the bit indexing convention is to designate the least significant bit as bit 0. Thus, the fourteen ADC output bits may be referred to as bits 0-13, and the nine DCC output bits may be referred to as bits 0-8.

A selection circuit 325 may select one of the six mapping choices based of the value of the ADC output 310 and the corresponding mapping region in Table I. In some implementations, the selection circuit includes one or more multiplexers to implement the selection using combinational logic. In other implementations, the selection circuit 325 may select the DCC output 320 from the mapping choices generated at different instances in time (i.e., at different clock cycles). To that end, the selection circuit 325 may use sequential logic (e.g., including registers, counters, etc.).

In the example implementation 300, the logical path 312a connects to circuit 330a that generates an input to the selection circuit 325. The output of circuit 330a corresponds to the first region of the mapping function 250. In some implementations, the circuit 330a selects and/or passes through the nine least significant bits of the 14-bit ADC output 310 as a choice for the DCC output 320. In another implementation, the circuit 330a may select and/or pass through just the first four bits (i.e., bits 0-3 of the ADC output 310), because in the first region of the mapping function 250 the remaining bits (i.e., bits 0-13) are zero. The circuit 330a may set the remaining bits (bits 4-8) to zero (0). Generally, a circuit may set a bit to 0 by connecting (e.g., by hard-wiring, through a pull-down resistance, or through a transistor) the associated trace to a voltage associated with 0, which may be the low voltage (e.g., ground) of the logic circuit. In any case, at least with respect to bits 0-3 of the ADC output 310, circuit 330a may be thought of as a pass-through or, equivalently, a divide-by-one operation.

The logical path 312b connects to circuit 330b that implements the divide-by-four operation associated with the second region of the mapping function 250. Circuit 330b may implement the division by four by selecting and/or passing through bits 2-10 of the ADC output 310. Alternatively, circuit 330b may select just four bits, bits 2-5 of the ADC output 310, for mapping to bits 0-3 of the DCC output 320. The circuit 330b may remap any number of bits between 4 and 9, though 4 bits is the minimum alternative, while the 9-bit remapping may be convenient in some implementations, e.g. for consistency among circuits 320a-f. In any case, circuit 330b implements the divide-by-four operation for the potentially non-zero bits of the ADC output 310 associated with the second region of the mapping function 250. The circuit 330b may set bits 5-8 to zero.

The logical path 312b continues to circuit 340b. Circuit 340b adds 16 to the mapped 9-bit output. In some implementations, circuit 340b simply sets bit 4 to one (1). Generally, a circuit may set a bit to 1 by connecting (e.g., by hard-wiring, through a pull-up resistance, or through a transistor) the associated trace to a voltage associated with 1, which may be the high voltage of the logic circuit. Alternatively, a logic circuit may set a bit to 1 using an OR-with-1 or an NAND-with-0 operation. If bit 4 is already 1, then setting it to 1 is no longer an add-16 operation. If bit 4 is already 1, however, then the associated ADC output 310 is not in the second range of the mapping, and the logical path 312b should not be selected as the DCC output 320.

The logical paths 312a,b generate the first two choice for the DCC output 320. The logical paths 312c-f connect, respectively, to circuits 330c-f, which operate analogously to the descriptions of circuits 330a,b above, but for different regions of the mapping function 250. Also analogously to circuit 340b, circuits 340c-d set the most significant bits of the corresponding choices for the DCC output 320 to 1. Specifically, circuit 330c maps at least bits 3-7 (at most, bits 3-11) of the ADC output 310 to bits 0-4 of the third choice for the DCC output 320. Corresponding circuit 340c sets bit 5 to 1. Bits 6-8 are set to or remain at 0. Circuit 330d maps at least bits 4-9 (at most, bits 4-12) of the ADC output 310 to bits 0-5 of the fourth choice for the DCC output 320. Corresponding circuit 340d sets bit 6 to 1. Bits 7-8 are set to or remain at 0. Circuit 330e maps at least bits 5-11 (at most, bits 5-13) of the ADC output 310 to bits 0-6 of the fifth choice for the DCC output 320. Corresponding circuit 340e sets bit 7 to 1. Bit 8 is set to or remains at 0. Circuit 330f maps bits 6-13 of the ADC output 310 to bits 0-7 of the sixth choice for the DCC output 320. Corresponding circuit 340f sets bit 8 to 1. Implementing the circuits 330a-f and 340a-f using combinational logic is discussed below with respect to FIG. 4. Implementing the circuits 330a-f and 340a-f using sequential logic is discussed below with respect to FIG. 5.

The circuits 330a-f and 340a-f may be generally configured to generate six N-bit digital values based on an M-bit value of the ADC output 310, according to any suitable mapping that uses division by powers of 2 and addition of an offset by setting one or more most significant bits to 1. Thus, in combination, the circuits 330a-f and 340a-f may be referred to as a mapping circuit 345. Although the implementation in FIG. 3 illustrates the mapping circuit 345 that generates six possible values for the DCC output 320, in other implementations the mapping circuit may generate 3, 4, 5, 8, 12, . . . , 32, 64, 128, or any other suitable plurality of N-bit digital values.

The selection circuit 325 selects one of the six choices (corresponding to the six region of the mapping function 250) for the DCC output 320 based on the value of the ADC output 310. The selected choice may be based on an output of a range select circuit 350. In general, the selection circuit 325 may select an N-bit compressed digital value from among any suitable number of choices generated by the mapping circuit 345.

In the example implementation 300, a range select circuit 350 receives the 14-bit ADC output and generates a selection code which may take on one of at least six possible values. The selection code serves as input for the selection circuit 325, determining the choice of the DCC output 320.

In some implementations, the range select circuit 350 may generate a 3-bit code. Any six of the eight possibilities of the 3-bit code may correspond, in any order, to the six ranges of the ADC output that determine the appropriate choice among the inputs to the selection circuit 325. The range select circuit may use digital comparators, or may be designed directly with logic gates. In a combinational logic implementation of the selection circuit 325 (i.e., when all six choice of DCC output 320 are available simultaneously), the 3-bit code generated by the range select circuit may serve, for example, as an input for a 9-bit 8×1 multiplexer (MUX) that selects among six 9-bit inputs. Two inputs of an 8×1 MUX may be unconnected (appropriately terminated) or connected to values that are among unused 9-bit values of the mapping function 250 to indicate an error.

In another implementations, the range select circuit 350 may generate a 6-bit code with a single 1-bit and remaining 0-bits. The digital values of the possible codes, 1, 2, 4, 8, 16, 32, may correspond, respectively, to the first through sixth regions of the mapping function 250. In a sense, this implementation of the range select circuit 350 may include the binary decoder function of a MUX and simplify implementation of the selection circuit 325.

Generally, the range select circuit 350 may generate any suitable code of any suitable bit length. The code generated by the range select circuit 350 may then select among the choices for the DCC output 320. In some implementations, the DCC may generate the choices for the DCC output 320 concurrently, and select among the choices using combinational logic. In other implementations, the DCC may generate the choices for the DCC output 320 sequentially, and use sequential logic to load the correct choice into the output register of the DCC. Further, the DCC may use a suitable mix of combinational and sequential logic.

The design of the DCC may reduce total transistor count, power consumption, and/or chip real estate. Additionally or alternatively, the design of the DCC may be optimized for speed, configurability, and/or any other suitable design variable.

VII. Logic Circuits for Implementing Example Mapping

Figure 4:
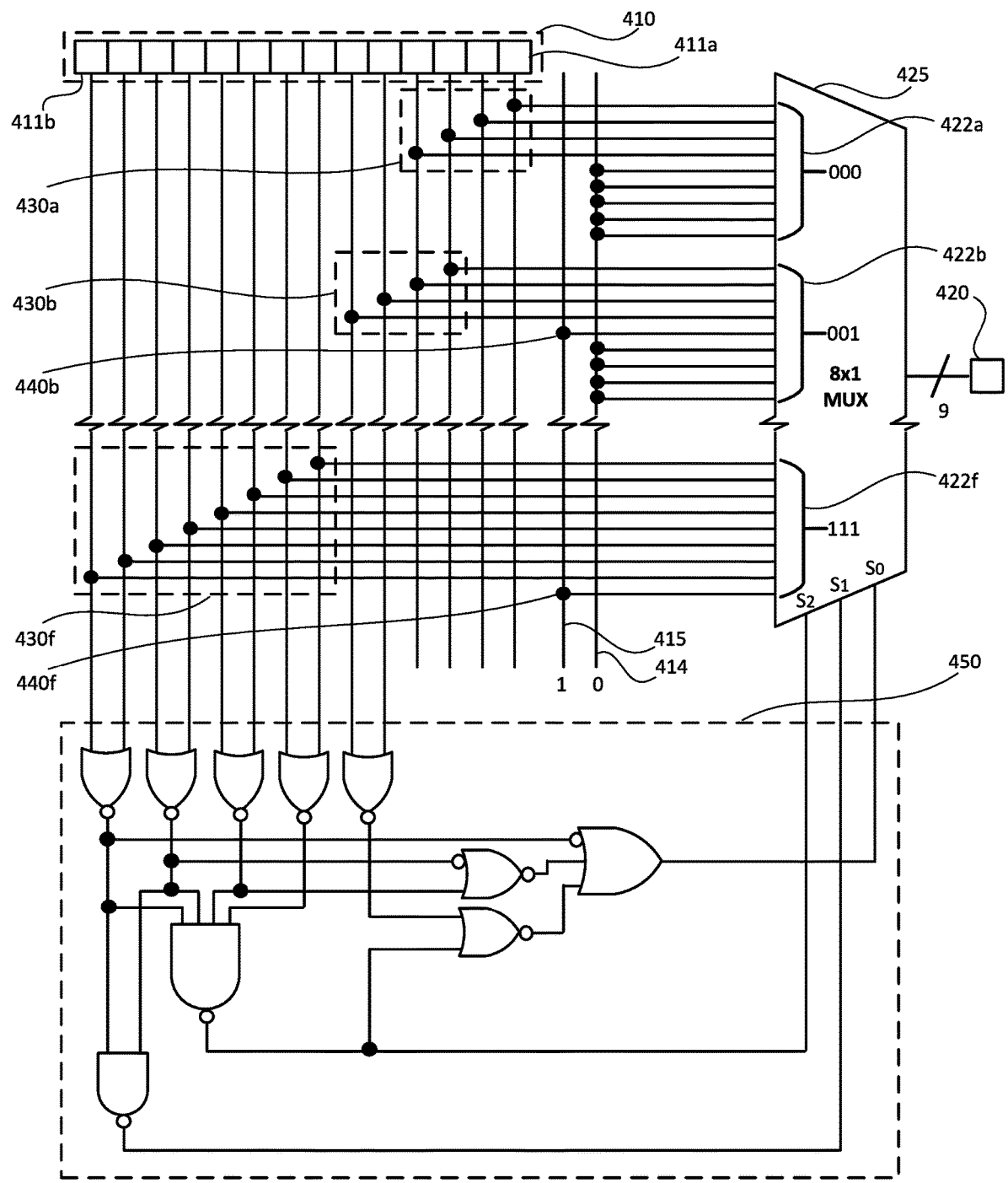
FIG. 4 is a diagram of a circuit implementing the logical block diagram of FIG. 3 using combinational logic.

FIG. 4 is a diagram of a circuit 400 of at least a portion of a DCC (e.g., DCC 126) implemented in combination logic. The circuit 400 may, for example, implement the block-diagram implementation 300 in FIG. 3. The 14-bit ADC output 410 may be the ADC output 310 of FIG. 3. A single bit register 411a contains the least significant bit of the ADC output 410, while a single bit register 411b contains the most significant bit of the ADC output 410. In addition to the ADC outputs 410, the digital logic circuits of the circuit 400 use a zero-trace 414 and a one-trace 415.

A 9-bit DCC output 420 (e.g., DCC output 320) takes the 9-bit value selected from MUX inputs 422a-f by the 9-bit 8×1 MUX 425 that may serve as an implementation of the selection circuit 325. FIG. 4 illustrates only the implementation of the inputs 420a,b, and 420f to avoid clutter.

The first four least significant bits of input 422a are the first four least significant bits of the ADC output 410. The connections 430a (illustrated as filled circles on the diagram) among the corresponding traces may implement circuit 330a. The rest of the bits for input 422a are set to zero by connections to the zero-trace 414.

The first four least significant bits of input 422b are bits 2-5 of the ADC output 410. Thus, the connections 430b may implement circuit 330b and, in a sense, a division by 4 for the values of ADC output 410 that are below 64, consistently with the second region of the mapping function 250. Trace connection 440b adds 16 to the MUX input 422b, implementing, for example, circuit 340b. The circuit 400 may analogously implement the inputs for MUX 425 corresponding to the third through fourth regions of the mapping function 250, as described above, in reference to FIG. 3.

The connections 430f of the seven most significant bits of the ADC output 410 may implement the divide-by-64 circuit 330f. The connection 440f, in turn, may implement the addition-of-256 function of the circuit 330f, by setting the most significant bit of the sixth 9-bit input 422f of the MUX 425 to 1.

An example range select circuit 450 may implement the range select circuit 350 using a set of logic gates. The range select circuit 450 generates 3-bit selection codes ($S_2S_1S_0$) that determine which of the eight inputs of the MUX 425 to connect to the DCC output 420. In the example implementation, the selection codes 000, 001, 100, 101, 110, and 111 select MUX inputs associated, respectively, with regions 1-6 of the mapping function 250, while the selection codes 010 and 011 are not used.

As discussed above, the combinational logic circuit implementation of the DCC in FIG. 4, may implement the mapping circuit 345 with combinational logic. The MUX 425, then, is an example combinational logic circuit that selects from the concurrently available possible outputs. In some implementations, at least some of the possible N-bit digital values for the DCC output 320 may be generated at different times, using sequential logic circuits.

Figure 5:
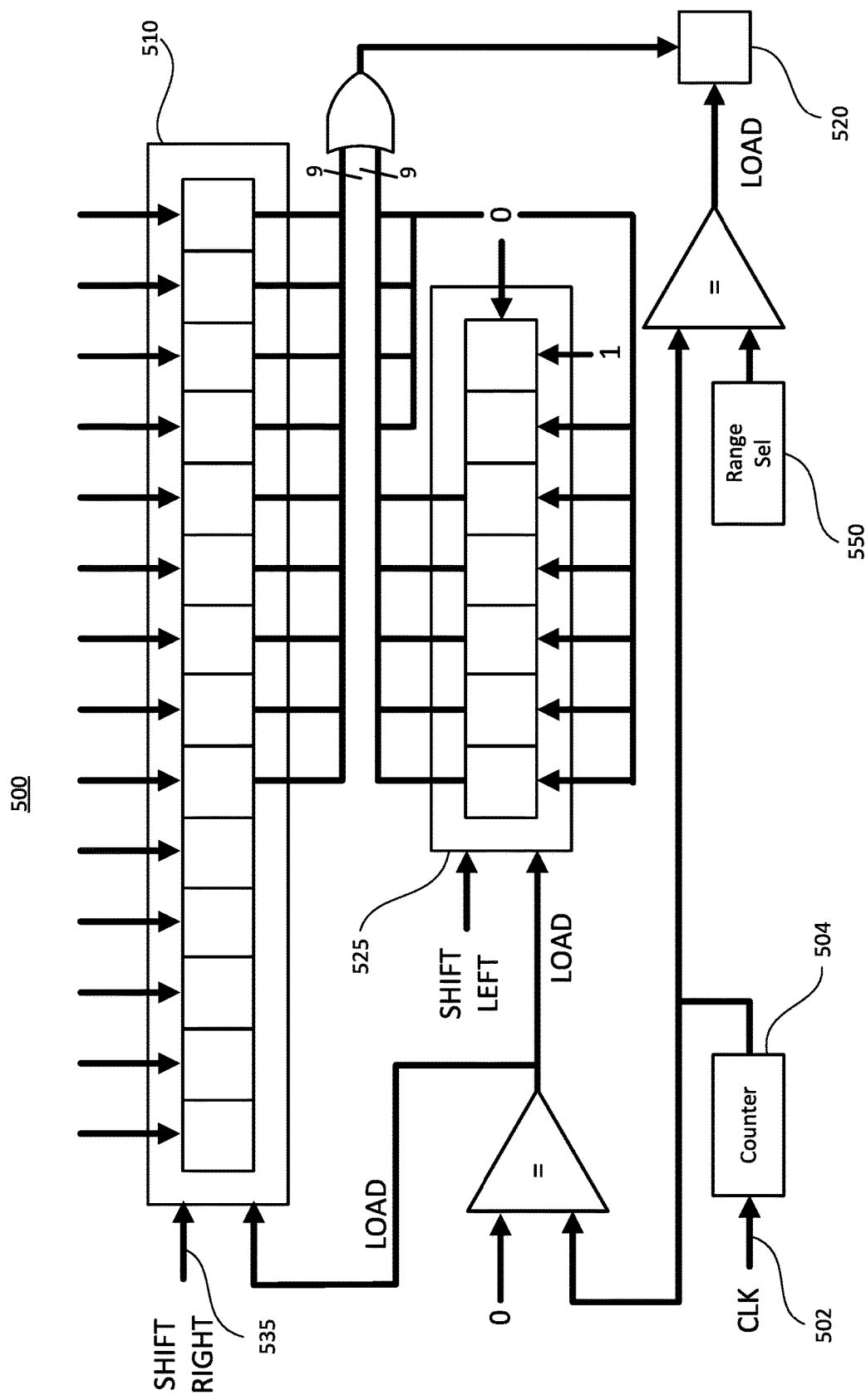
FIG. 5 is a diagram of a circuit implementing the logical block diagram of FIG. 3 using combinational logic.

FIG. 5 is a diagram of a circuit 500 of at least a portion of a DCC (e.g., DCC 126) implemented using sequential logic. A clock input 502 and a counter 504 may drive the operation of the sequential logic in the circuit 500. The counter 504, for example, may be a 3-bit, 4-bit, 8-bit, or any other suitable size of a counter. Generally, the counter 504 may be configured to repeatedly count from any start value to any end value that can be represented by the counter with successive pulses of the clock input 502. In the example of FIG. 5, the counter 504 is configured to start at zero. The end value of the counter 502 may be 7, for example.

When the counter is at zero, a 14-bit output of an ADC (e.g., ADC 126) may be loaded into a 14-bit input shift register 510, with the least significant bit (LSB) loaded via input 511 into register location 512 of the input shift register 510. The register location 512 may be referred to as the LSB location of the input shift register 510. From the 14 bits in the input shift register 510, the circuit 500 may use nine bits, stored in locations including and sequentially adjacent to the LSB location 512, to generate a plurality of 9-bit compressed digital values. The circuit 500 may load one of the plurality of the 9-bit compressed digital values into a DCC output register 520.

The circuit 500 includes a comparator 525. The output of the comparator 525 may determine which one of the plurality of the 9-bit compressed digital values the circuit 500 loads into the DCC output register 520. Thus, the comparator 525, in cooperation with the loading functionality of the output register 520, may implement the selection circuit 325.

To generate the plurality of the 9-bit compressed digital values corresponding to the mapping 250, the circuit 500 may use the input shift register 510 and an auxiliary shift register 535. The input shift register 510 may be configured to implement, at different cycles of the clock input 502 and/or different values of the counter 504, the power-of-2 divisions corresponding to the regions 1-6 of the mapping 250. The auxiliary register 535, on the other hand, may be configured to generate, at different cycles of the clock input 502 and/or different values of the counter 504, power-of-2 values for addition corresponding to the regions 1-6 of the mapping 250. In FIG. 5, the input shift register 510 is configured to shift to the right, while the auxiliary shift register 535 is configured to shift to the left.

The circuit 500 may sequentially implement the mapping 250 as follows. When the value of the counter 504 is zero, the circuit 500 loads the input shift register 510 with the 14-bit ADC output and the auxiliary shift register 535 with 1 for the LSB and zeros of other bits.

At another clock cycle, the value of the counter 504 goes up to 1. The circuit 500, in an example implementation, may configure shift inputs 536, 538 of the shift registers 510 and 635, respectively, to be enabled (activating register shifts) at all non-zero counter values. Alternatively, the shift inputs 536, 538 may be enabled at any suitable non-zero counter values. In the example implementation, when the value of the counter 504 goes to 1, the bits in the input register 510 shift to the right, the bits in the auxiliary shift register 535 shift to the left, and the LSB is replaced by 0. In the input shift register 510, the shift to the right implements a division by 2. In the auxiliary register 535, the shift implements multiplication by 2.

At subsequent clock cycles, the value of the counter increments further. The shifts in the input shift register 510 and the auxiliary register 535 implement division by 2 and multiplication by 2, respectively. The circuit 500 uses an OR-gate 540 to implement the addition of the most significant bit according to the mapping 250. The shifting of the shift registers 510 and 535, in combination with the OR gate 540, can be thought of as an implementation of the mapping circuit 345 for the mapping 250.

The circuit 500 implements the mapping circuit 345 using sequential logic elements (shift registers) in cooperation with combinational logic (OR gate) to generate, at different times, the plurality of digital values that serve as alternatives for the DCC output 920. The comparator 525, in cooperation with the counter 504 (a sequential logic element) implement the selection circuit 325 to select, from the plurality of options, the appropriate compressed digital value to load into the DCC output 520. The selection of the DCC output 520 is based, in the example circuit 500, on the output of a range select circuit 550.

The range select circuit 550 may identify a range, from non-overlapping ranges of the mapping 250, into which the ADC output (loaded into the input shift register 510) falls. The range select circuit may include combinational logic analogous to the range select circuit 450 of FIG. 4. The range select circuit 550 may compute a digital value (e.g., a 3-bit value from 0 to 7) corresponding to the range at the clock cycle corresponding to the zero value of the counter 504 and store the digital value in a register. The register value of the range select circuit 550 may determine at which value of the counter 504, the DCC output 520 is loaded.

VIII. Alternative Implementation of Example Encoding

Figure 6:
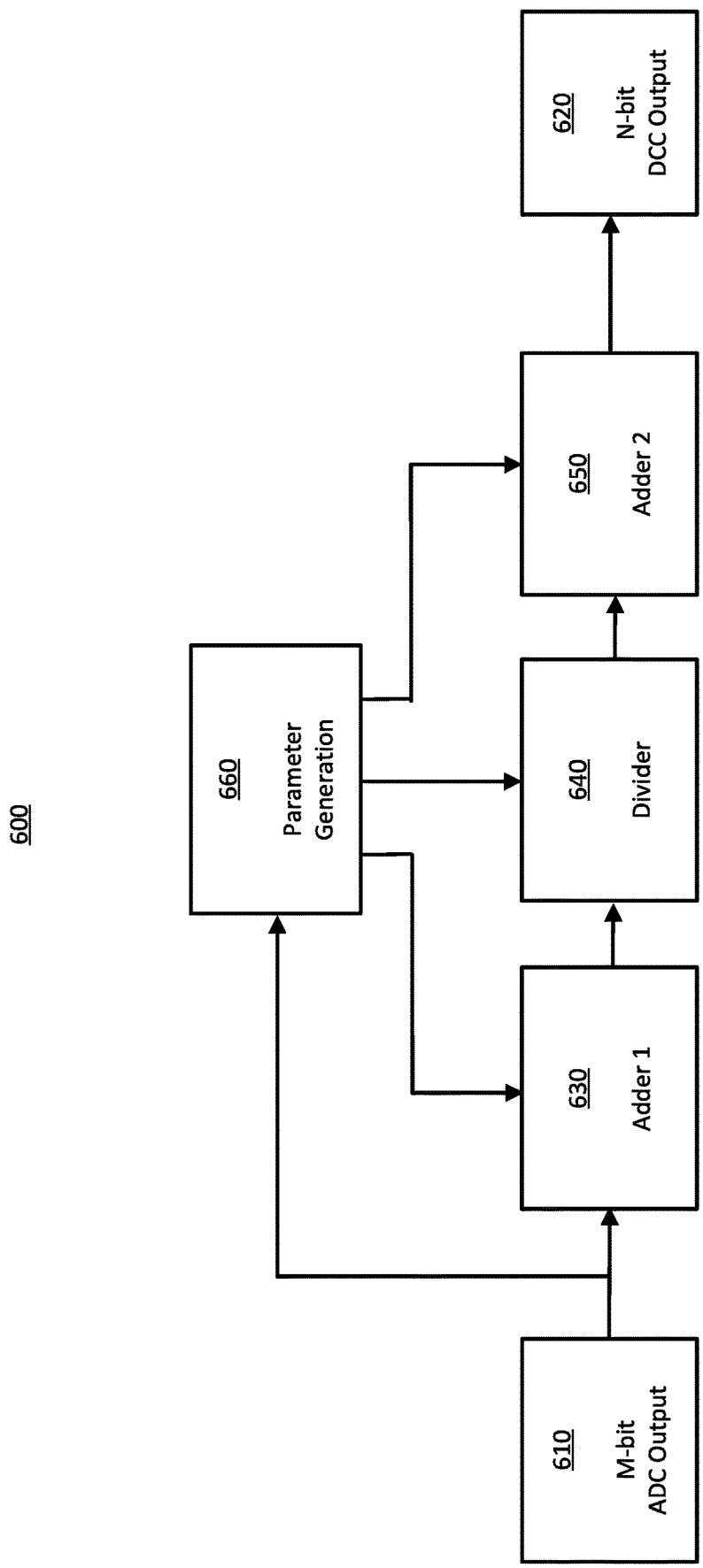
FIG. 6 is a block diagram of an alternative example logical implementation of at least a portion of a digital compression circuit that implements the mapping illustrated in FIG. 2.

FIG. 6 is a block diagram of an alternative example logical implementation 600 of a DCC (e.g., the DCC 126) that may implement the mapping function 250 in FIG. 2. The implementation 600 converts an M-bit ADC output 610 to an N-bit DCC output 620 by transforming the M-bit ADC Output 610 with a first adder 630, a divider 640, and a second adder 650. A parameter generation circuit 660 may select parameters, i.e., the first offset, the divisor, and the second offset, for the first adder 630, the divider 640, and the second adder 650, respectively. In some implementations, the divider 640 may be an integer divider. In other implementations, the divider 640 may be a floating point divider.

The parameters chosen by the parameter generation circuit 660 may be based on a range (of a plurality of non-overlapping ranges of possible ADC outputs) into which the value of ADC output 610 falls. To that end, the parameter generation circuit 660 may include a range select circuit analogous to the range select circuits (e.g., circuits 350, 450, 650).

In some implementations, the parameter generation circuit 660 may generate parameters for the adders 630, 650 and the divider 640 using one or more sequential circuit elements. In other implementations, the parameter generation circuit 660 may rely on combinational logic circuit elements. For example, the parameter generation circuit may use multiplexers to select from the predetermined parameters. In some implementations, the pre-determined parameters may be hardwired into a circuit. In other implementations, the predetermined parameters may be programmatically configured and stored in registered. Thus, the implementation 600 may be programmatically configured to alter a mapping function to implement the compressive encoding.

IX. Alternative Encoding of Pixel Value

The example mapping 250 in FIG. 2 used division by 2 and an additive offset to compressively encode a 14-bit ADC output to a 9-bit DCC output. The quantization noise introduced by the encoding did not exceed Poisson noise because re-quantization step doubles when the Poisson noise doubles. In other implementations, the quantization step may follow Poisson noise more closely to achieve a higher level of compression.

Figure 7:
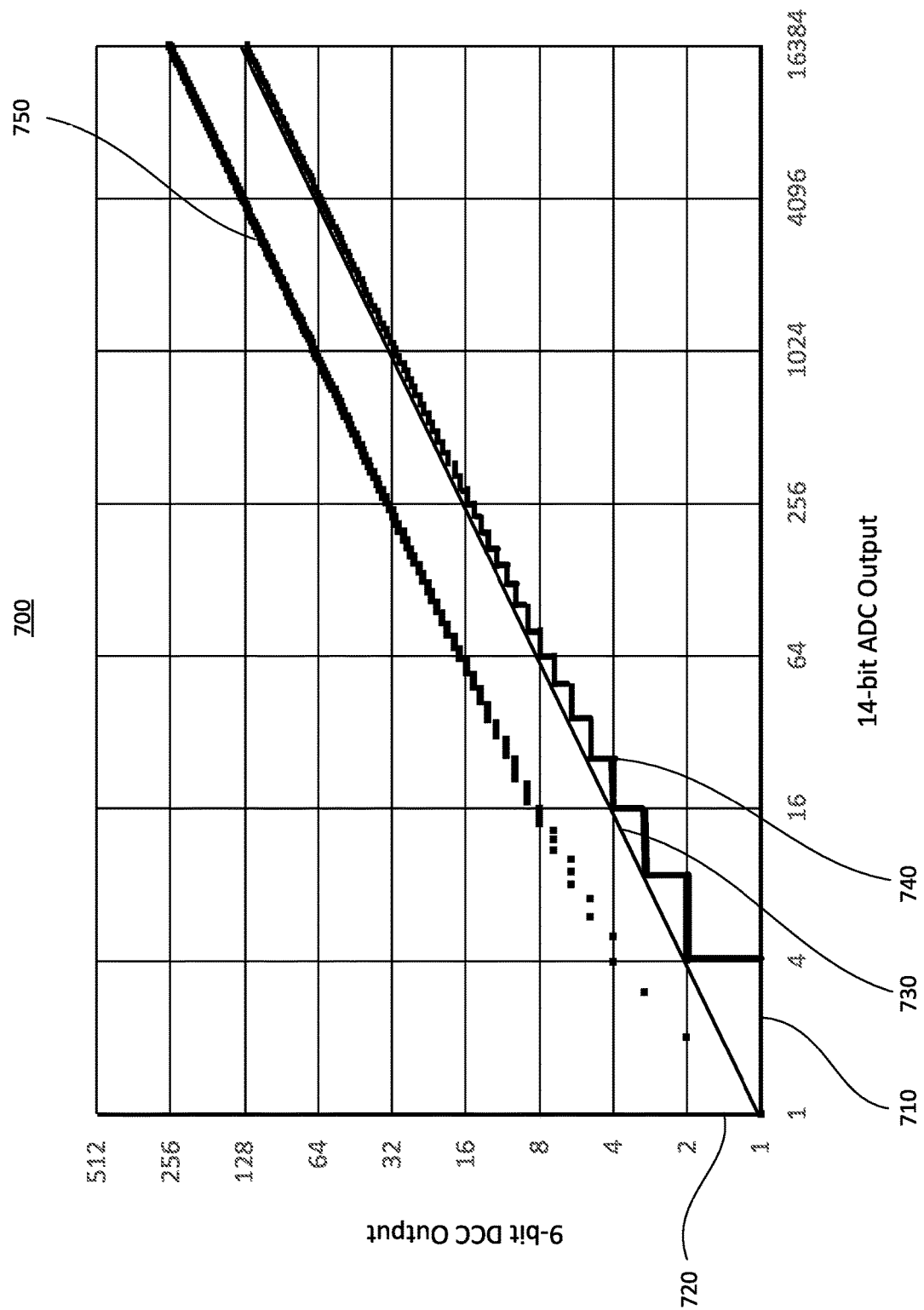
FIG. 7 is a chart of an alternative example mapping of a digital pixel value used to compressively encode a 14-bit output as a 9-bit output.

FIG. 7 is a chart 700 illustrating an alternative encoding of pixel values from the 14-bit output of an ADC (e.g., ADC 124) to a compressed output of a DCC (e.g., DDC 126). In one implementation, the example encoding may be used to generate a 9-bit DCC output. In another implementation, the example encoding may be used to generate an 8-bit DCC output, as discussed below.

The re-quantization step line 740 represents the number of outputs of the ADC that map to the same output of the DDC as a function of the ADC output. The re-quantization step line 640 transitions to a new step at every ADC output that is a square of an integer (i.e., 4, 9, 16, 25, . . . , $126^2$, $127^2$).

The mapping function 750 represents the example encoding of DDC outputs as a function of the ADC outputs that is consistent with the re-quantization step line 740. Furthermore, the mapping function 750 represents a continuous encoding, using every consecutive value between the minimum and the maximum encoded values.

The example mapping function 750 represents the 16385 possible input values with 260 possible output vales. Though all of the 260 possible output values cannot be uniquely represented with less than 9 bits, small adjustments to the mapping function 750 may enable an 8-bit representation. For example, the dynamic range may be slightly reduced or the quantization step may be slightly increased to allow a 256-value range for output that can be represented with 8 bits.

The example mapping function 750 has 127 regions corresponding to quantization steps from 1 to 127. The implementation 600 of the mapping 250 may be adapted to at least approximately implement the mapping function 750. For example, a subset of the 127 regions of the mapping function 750 may be selected for a transformation. Once the parameter generation circuit identifies the appropriate region, the first adder 630 may subtract the maximum x-value (i.e., ADC output) of the previous region, the divider 640 may divide by the quantization step, and the second adder 650 may add the maximum y-value of the previous region incremented by 1.

Additionally or alternatively, implementation of the mapping function 750 may use a digital approximation of a square root of the input (i.e., the ADC output value). Specifically, the output of the mapping (i.e., the compressed DCC output may be approximated as twice the square root of the input plus, for added accuracy, a small offset). In some implementations, the square root may be approximated by counting how many odd numbers can be subtracted from the input.

Still additionally or alternatively, the mapping function 750 may be implemented using a lookup table. The lookup table may be implemented using any suitable digital memory. In some implementations, the lookup table may be shared among multiple pixels. In some implementations, a DCC (e.g., DCC 126) may use the lookup table to directly look up an output value of the mapping based on the input value. In other implementations, a DCC (e.g., DCC 126) may use the lookup table to look up one or more parameters based on a region of the mapping function 750 digitally computed from the ADC input.

X. Compressive Encoding for Detectors with Adjustable Gain

The discussion above focused on compressively encoding an ADC output that represents a photon count. In charge-integrating implementations, however, the relationship between a digital value generated by the ADC (e.g., ADC 124) and the number of photons detected by a sensor (e.g., sensor 110) during an integration time interval may depend on adjustable gain. The front end (e.g., front end 122) may select one of available gains based on detecting the rate of charge or voltage accumulation at a pixel (e.g., pixel 105).

Figure 8:
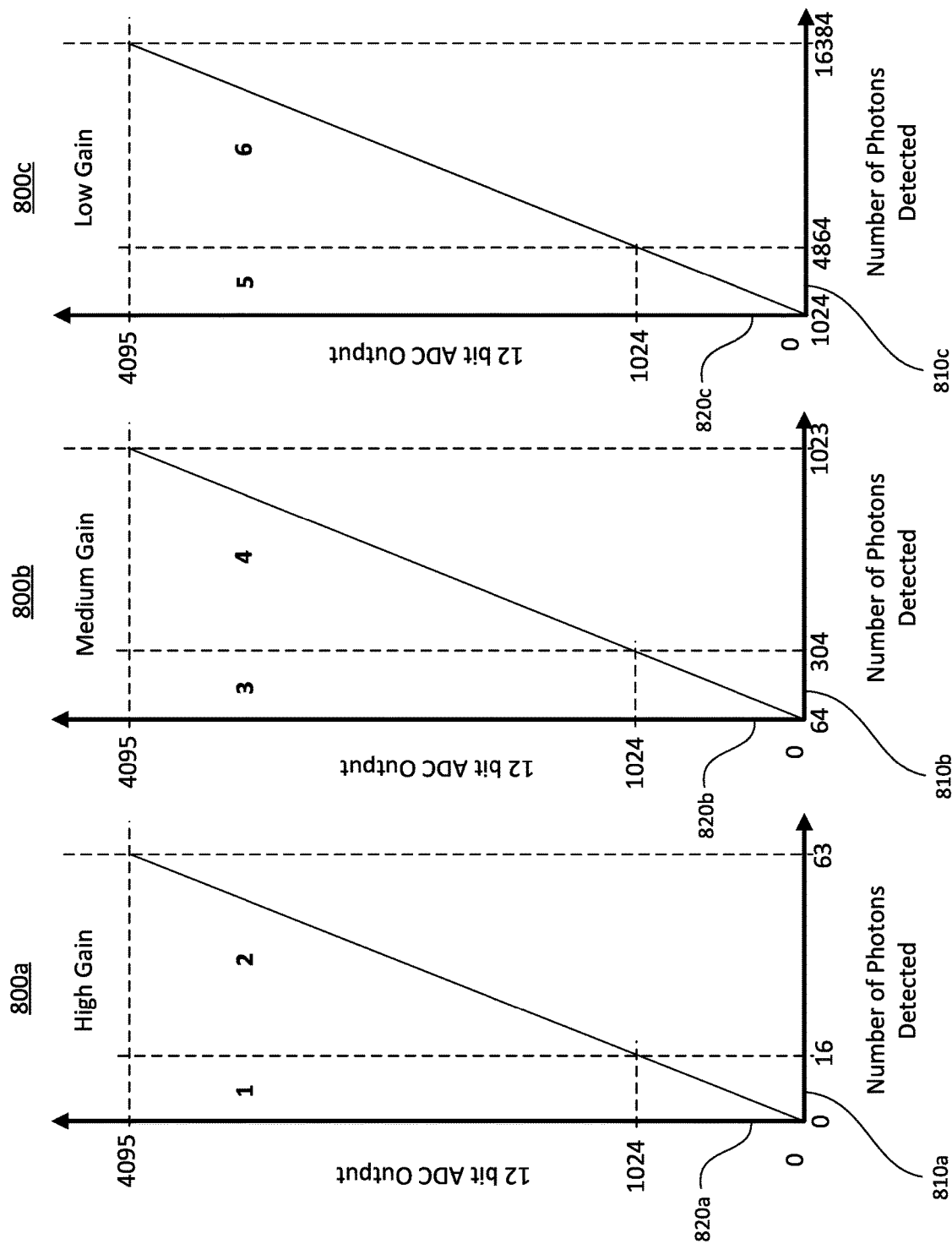
FIG. 8 includes three charts illustrating a relationship between a number of detected photons on and a 12-bit digital output for high, medium, and low gains, respectively, for a pixel of a charge-integrating detector.

FIG. 8 includes three charts 800*a-c* illustrating a relationship between the number of detected photons on the x-axis 810a-c the 12-bits of ADC output on the y-axes 820-a for high, medium, and low gain, respectively. The analog front end may report the gain using a suitable number of bits. The bits reporting gain may be included in the ADC output. For example, with two bits representing one of three (potentially, up to four) selectable gains may be added to the 12 bits of ADC to generate a 14-bit ADC output indicative of the photon count. In general, an ADC may generate an M-bit raw digital value by including the bits indicative of the gain selected by the front end.

The relationship between detected photons and a 12-bit ADC in chart 800a has 4096/64=64 ADC steps per photon. Because Poisson noise has a standard deviation value of at least one photon, encoding each 64 steps of the ADC output with a single value would result in quantization noise no greater than Poisson noise. Furthermore, when the 12-bits of the ADC value reach 1024 (at high front-end gain), the corresponding number of photons is 16, and the Poisson noise is 4×64=256 ADC steps. Thus, for 12 bits of the ADC output between 1024 and 4095, encoding each 256 steps of the ADC output with a single value would result in quantization noise no greater than Poisson noise.

Splitting the 12-bit ADC into a 0-1023 region, and a 1024-4095 for each of the gains, generates six regions for a 14-bit ADC value (where 2 bits indicating gain are added to the 12-bits of the ADC output). Subsequently, a DCC may encode the 14-bit raw digital output of the ADC into a 9-bit compressed digital output using a mapping analogous to mapping 250, but with different parameters. Table II describes an example mapping function for encoding the ADC output for the six regions in the charts 800a-c.

Figure 9:
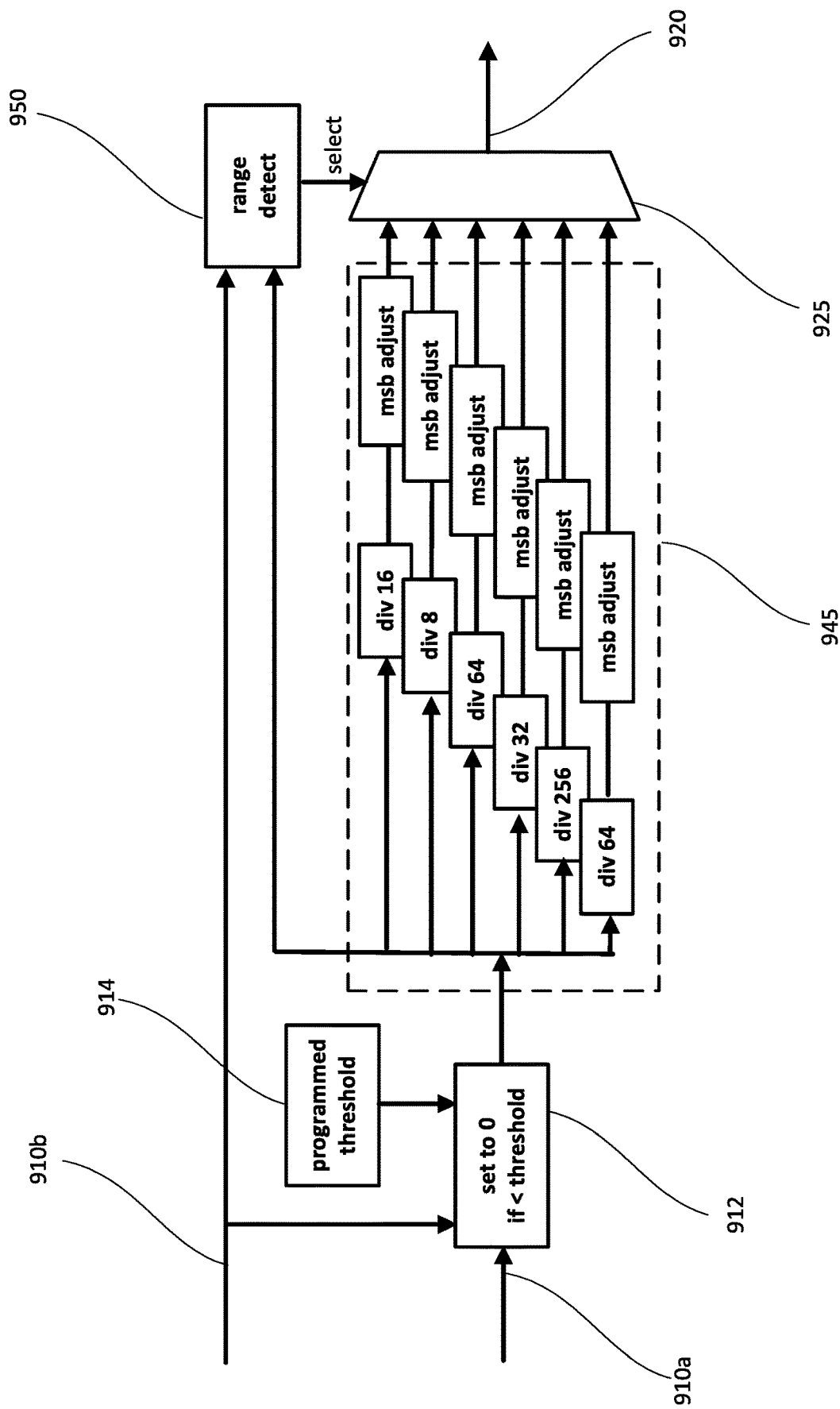
FIG. 9 is a block diagram illustrating a logical implementation of a mapping from a 12-bit digital output and 2-bit gain indication to a 9-bit compressively encoded pixel output.

FIG. 9 is a block diagram illustrating a logical implementation of the mapping in Table II. The mapping may be implemented by the DCC (i.e., the DCC 126). The inputs 910a, 910b represent, respectively, the 12-bit ADC value (i.e., without the gain bits) and the 2 gain bits. If the gain bits represent the high gain region, the DCC may use a de-noising circuit 912 to set the output value to zero. The de-noising circuit may determine whether the 14-bit value generated by the ADC (including gain bits) falls below a threshold corresponding to a stored pixel noise floor 914. Subsequently, the 14-bit ADC value is encoded, for example, into six 9-bit choices for a DCC output 920. A selection circuit 925 may select from the six possible outputs.

In the example implementation, after the de-noising circuit, 12 bits of the ADC output (excluding the gain bits) may be directed to a mapping circuit 945 configured to implement the mapping of Table II. As discussed above, the mapping circuit 945 may generate 9-bit output options for the DCC output 920 concurrently or sequentially (e.g., using shift registers, counters, etc.).

A range select circuit 950 (analogous, for example, to the range select circuits 350, 450, and 550) may determine which of the 9-bit options generated by the mapping circuit 945 is directed to the DCC output 920. For the mapping in Table II, the range select circuit 950 may take a three bit input—two gain bits and a third bit, identifying whether the 12-bit ADC output is at least 1024.

The mapping circuit 945 relies on division by a power of two and adding power-of-two offsets by adjusting most

| Region | In: 12-bit ADC value | Gain bits | # of photons | ADC steps per photon | DCC step | Conversion Formula | Out: DCC Output |
|---|---|---|---|---|---|---|---|
| 1 | 0-1023 | 00 | 0-15 | 64 | 64 | R = [P/64] + 0 | 0-15 |
| 2 | 1024-4095 | 00 | 16-63 | 64 | 256 | R = [P/256] + 16 | 20-31 |
| 3 | 0-1023 | 01 | 64-303 | 7.5 | 32 | R = [P/32] + 32 | 40-63 |
| 4 | 1024-4095 | 01 | 304-1023 | 7.5 | 64 | R = [P/64] + 64 | 80-127 |
| 5 | 0-1023 | 10 | 1024-4863 | 0.36 | 8 | R = [P/8] + 128 | 160-255 |
| 6 | 1024-4095 | 10 | 4864-16383 | 0.36 | 16 | R = [P/16] + 256 | 320-511 |

The mapping in Table II generates the same number of outputs, represented by the same 9-bit binary values, as the mapping 250. Thus, the DCC that implements the mapping in Table II can compress a 14-bit value indicative of number of detected photons (with 2 bits representing gain) into a monotonically increasing (i.e., larger 9-bit values representing higher photon counts) 9-bit sequence.

In some implementation, the noise in the high gain region may exceed the Poisson noise, particularly for low number of detected photons. This noise creates a noise floor, below which the number of detected photons may cannot be detected with suitable confidence. The mapping may be adjusted to encode ADC values that are below the noise level to zero. A threshold level of a digital value of the ADC output may be chosen to correspond to the noise level. The threshold value may be set programmatically for each pixel. In some implementation, each pixel (e.g., pixel 105) may have a memory location to store the threshold value. The threshold values may be determined during a calibration procedure. For example, the detector 100 may be configured to for detection in darkness (i.e., without impinging photons in the spectral region of detection) to determine noise floor and corresponding threshold value of the ADC output for each pixel.

significant bits (MSBs) of outputs. The resulting DCC circuits may be implemented in a compact manner.

Figure 10:
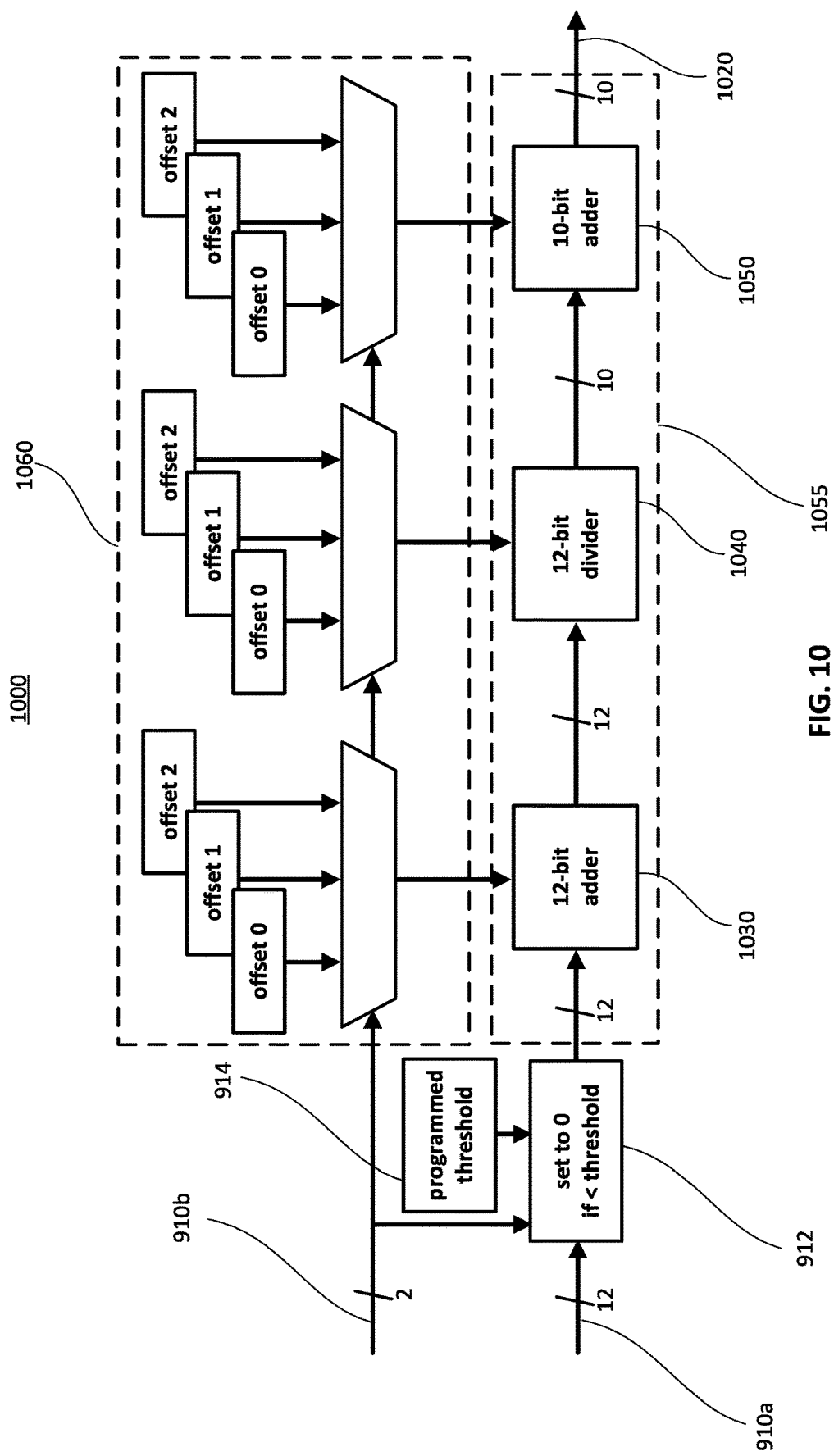
FIG. 10 is a block diagram illustrating an alternative logical implementation of a mapping from a 12-bit digital output and 2-bit gain indication to a compressively encoded pixel output.

FIG. 10 is a block diagram illustrating an alternative logical implementation 1000 of a compressive encoding by a DCC (e.g., the DCC. The implementation 1000 follows the logic of the implementation 600 of FIG. 6. The inputs 910a,b may be the same as the corresponding inputs 910a,b of FIG. 9. The DCC output 1020, on the other hand, represents a 10-bit output of an alternative mapping, leading to a 10-bit encoding of the DCC output value. The DCC may implement the mapping using a 12-bit adder 1030, a 12-bit divider 1040, and a 10-bit adder 1050, which may be example implementations of the first adder 630, the divider 640, and the second adder 650 of the more general implementation 600 in FIG. 6. The combination of the adders 1030, 1050, and the divider may be referred to as a mapping circuit 1055.

A parameter generation circuit 1060 may be an implementation of the more general parameter generation circuit 660. The parameter generation circuit 1060 may select one among three parameters (offset 0, offset 1, offset 2) for the 12-bit adder 1030, one among three parameters (divisor 0, divisor 1, divisor 2) for the 12-bit divider 1040, and one among three parameters (offset 3, offset 4, offset 5) for the 10-bit adder 1050 based on the gain bits input 910b. Any of the offset may be negative (represented in two's complement). For example, for medium gain, the mapping circuit 1055 may obtain the 10-bit output value by adding offset 1 to the 12-bit input value (12-bits of the ADC output, excluding gain bits), dividing the 12-bit result by divider 1, and adding offset 4 to the 10-bit (or another suitable binary length) result to obtain the 10-bit value for the DCC output 1020.

In an alternative implementation, the parameter generation circuit 1060 may choose among 4, 5, 6, 8, 10, 20, or any other suitable number of options for the parameters for each of the operations. Selecting among more than four options may be based on three or more bits. In some implementations, the three or more bits may represent gain in the analog front end (e.g., analog front end circuit 122). In other implementations, some of the bits of the ADC that do not represent gain may also be inputs for the parameter generation circuit 1060.

The implementation 1000 does not rely on power-of-two addition and/or division. Although the digital circuit implementation of the implementation 1000 make take up more space on a chip than the implementation 600, the implementation 1000 offers flexibility in choosing and reprogramming offsets and dividers.

XI. Aggregation of Pixel Values

To generate a frame of data based on DCC output values at each pixel (e.g., pixel 105), the detector 100 may aggregate bit sequences corresponding to pixel values at a digital processing unit (e.g., unit 150). The digital processing unit may be implemented in a circuit board or an ASIC to the side of the pixel array (e.g., array 101). Thus, the digital processing unit may be referred to, at least in the case of an ASIC implementation of the detector, as an edge circuit. A bus (e.g., bus 130) or a set of busses (e.g., busses 132) may provide a communicative connection between each pixel and the edge circuits. Multiple pixels may share a single bus, and a sequential logic circuit may be configured to bring, in sequence, multiple pixel values to the digital processing unit along the shared bus. To that end, each pixel circuit (e.g., pixel circuit 120) may include a pixel aggregation circuit (e.g., pixel aggregation circuit 128).

FIG. 11A illustrates an example pixel aggregation circuit 1128, which may be, for example, an implementation of the pixel aggregation circuit 128 in FIG. 1. The pixel aggregation circuit 1128 may include an aggregation register 1130 (or, simply, register 1130), an aggregation multiplexer 1140 (or, simply, multiplexer 1140) which output is connected to the input of the register 1130, two data input 1150*a*, *b*, an output 1160, and a control input 1170. The register 1130 may be a multi-bit register, configured to load (e.g., in parallel) and store a bit sequence of 4, 6, 8, 10, 12, or any other suitable number of bits. The multiplexer 1140 may be a multi-bit multiplexer, configured to select between two multi-bit sequences of the same dimension as the register 1130. The aggregation register 1130 may be configured to load and store, for example at each clock cycle, the output of the multiplexer 1140. The multiplexer 1140 may be configured to select a bit sequence between two bit sequences available at the multi-bit data inputs 1150*a* and 1150*b*.

The bit sequence at the data input 1150*a* may be generated at the corresponding pixel, e.g., by the DCC of the same pixel circuit of which the aggregation circuit 1128 is a portion. The bit sequence at the data input 1150*b*, on the other hand, may be a bit sequence stored at an aggregation register on a neighboring pixel. Conversely, the output 1160 of the pixel aggregation circuit 1128 may make the data stored in the register 1130 available to an input of a pixel aggregation circuit of a neighboring pixel.

The multiplexer 1140 may determine which bit sequence is loaded into the register 1130 based on the control input 1170 of the pixel aggregation circuit 1128. For example, when the value of the control input 1170 is 0, the input 1150*b* from a neighboring pixel may be passed to the output of the multiplexer 1140 and, consequently, the corresponding bit sequence from a neighboring pixel may be loaded into the register 1130. When the value of the control input is 1, on the other hand, the input 1130*a* is passed to the output of the multiplexer 1140, and the bit sequence generated at the pixel corresponding to the aggregation circuit 1128 is loaded by the aggregation circuit 1128 into the register 1130.

In some implementations, the control input 1160 is a frame synchronization (or frame sync) input. The frame sync may be configured to go high (i.e., switch from 0 to 1) and, thereby, signal simultaneously to all of the pixels in the detector 100 to load the generated pixel values into their corresponding aggregation registers.

Figure 12:
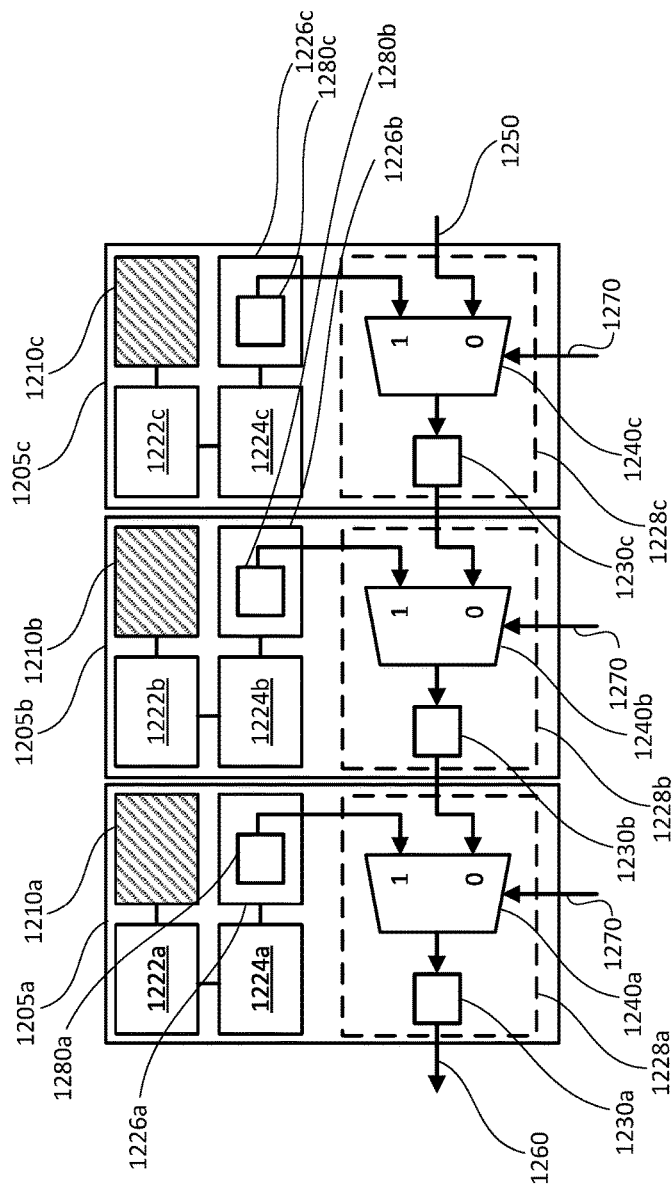
FIG. 12 schematically illustrates aggregation of pixel values in a set of daisy-chained pixels sharing the same bus.

FIG. 12 schematically illustrates aggregation of pixel values in a set of daisy-chained pixels 1205*a-c* sharing the same bus. The pixels 1205*a-c* include corresponding sensors 1210*a-c* (e.g., sensor 110), analog front ends 1222*a-c* (e.g., front end circuit 122), ADCs 1224*a-c* (e.g., ADC 124), DCCs 1226*a-c* (e.g., DCC 126), and pixel aggregation circuits 1228*a-c* which may be copies of the pixel aggregation circuit 1128. The pixel aggregation circuits 1228*a-c* include corresponding aggregation registers 1230*a-c* (e.g., register 1130) and multiplexers 1240*a-c* (e.g., multiplexer 1240).

An input 1250 connected to the multiplexer 1240*c* may be an output of a preceding pixel (not shown) connected to the same bus. An output 1260 of the aggregation register 1230*a* may be connected to the following pixel sharing the same bus. Alternatively, if the pixel 1205*a* is the last in the daisy chain of pixels, the output 1260 may be connected, for example, to the digital processing unit (e.g., digital processing unit 150). Thus, the shared bus (e.g., bus 130) includes the input 1250, the output 1260 and other connections between aggregation registers (e.g., 1230*b,c*) and the respective multiplexers 1240*a,b* of the pixels (e.g., 1230*a,b*) following in the daisy chain.

For each frame, pixels 1205*a-c* may store generated values in corresponding registers 1280*a-c*. In the example implementations, the registers 1280*a-c* are included in the corresponding DCCs 1226*a-c*. In another implementation, the registers 1280*a-c* may be included in the corresponding pixel aggregation circuits 1228*a-c*.

The aggregation registers 1230*a-c* may be configured to load when in response to corresponding load inputs (not shown). In some implementations, the registers 1230*a-c* may be configured to load when the load inputs go high (i.e., switch from 0 to 1). In other implementations, the registers 1230*a-c* may be configured to load when the load inputs go low (i.e., switch from 1 to 0). In any case, the aggregation registers 1230*a-c* may be configured to load with the outputs of the corresponding multiplexers 1240*a-c* at every period of a periodic signal, such as a clock. The clock may be referred to as a shift clock, because, as discussed below, the clock controls the rate at which pixel values shift from one register to another along the daisy-chain of pixels.

In an example implementation, reading out (and delivering to a digital processing unit, such as unit 150) pixel data from every pixel in a plurality of pixels (e.g., array 101)

occurs over a series of clock cycles. Considering, for example, pixels 1205a-c, at the first of the series of clock cycles, the aggregation circuits 1228a-c may load the aggregation registers 1230a-c with the contents of the respective DCC output registers 1280a-c. To that end, the control inputs 1270 may receive a frame synchronization signal overlapping with the pulse of the first clock cycle. At each subsequent clock cycle of a read-out (e.g., until the digital processing unit 150 receives all the pixel values) the values in the aggregation registers 1230a-c move to neighboring aggregation registers (or, to the digital processing unit 150 for pixels at one end of the daisy chain). For example, after one clock cycle, the value in resister 1230c moves to register 1230b, the value in register 1230b moves to register 1230a, and the value in the register 1230a may be read by the digital processing unit (if pixel 1205a is the edge pixel in the daisy chain).

In an example implementation, the array 101 may have eight rows and ten columns of pixels. Each row of pixels may be daisy-chained to share the same bus (e.g., bus 130). The example array 101 may then be read-out in 11 clock cycles. The first clock cycle may load each pixel value into a corresponding aggregation register, while the subsequent 10 cycles may read-out the array 101 column-by-column into the digital processing unit 150.

In general, pixels in a detector array may connect to a digital processing unit (e.g., digital processing unit 160) in one of a variety of configurations. In one implementation, each pixel may be directly connected to the digital processing unit and all the pixels may be read-out simultaneously. In another implementation, all of the pixels may be daisy-chained to share a single bus and read out in series, as described above. An implementation where multiple groups of (e.g., rows) of pixels are daisy-chained may be chosen as a compromise between speed of read-out and complexity of the circuitry, particularly in view of circuit real estate.

Read-out time may depend on clock rate and a number of pixels daisy-chained for serial read-out. For example, to read out a 256×256 pixel array, with each row (or column) sharing a bus, at a clock rate of 100 MHz, it may take about 2.57 μs. The corresponding maximum continuous frame rate limit given by the inverse of the read-out time is about 389 kHz. One implementation for achieving a higher frame rate limit is increasing the frequency of the shift clock. For example, increasing the clock frequency to at least 257 MHz may enable a 1 MHz frame rate. In another implementation, a wider bus, capable of carrying in parallel multiple pixel values, may enable a higher frame rate.

Figure 13:
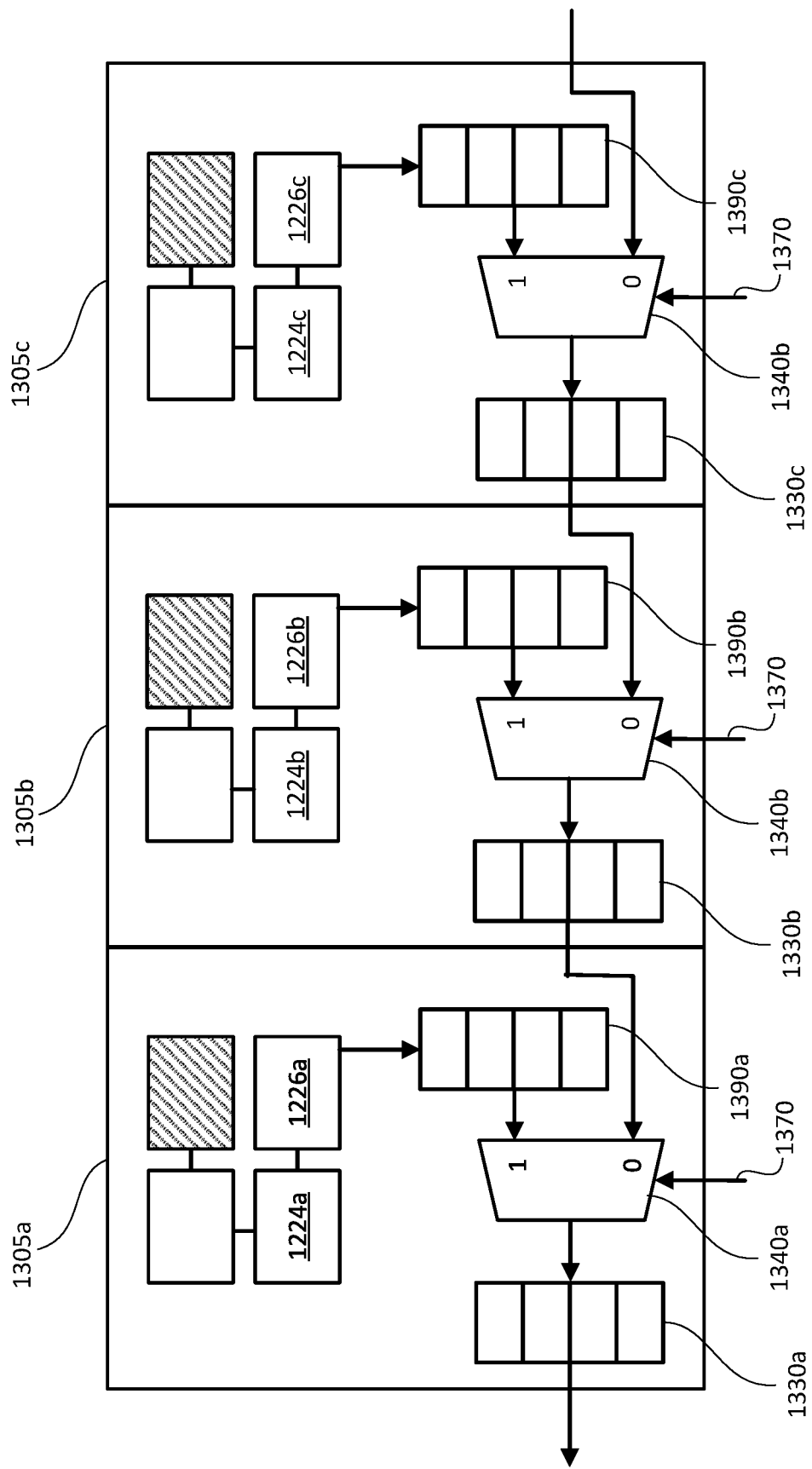
FIG. 13 schematically illustrates an implementation of pixel aggregation in which multiple pixel values are transported in parallel along the shared bus shared.

FIG. 13 schematically illustrates an implementation of pixel aggregation in which multiple pixel values are transported in parallel along the bus shared by a set of pixels. Three pixels 1305a-c may be a sub-set of daisy-chained pixels sharing the same bus. The pixels 1305a-c may be an alternative implementation of the pixels 1205a-c in which the aggregation registers 1230a-c are replaced with aggregation registers 1330a-c configured to store bit sequences that encompass multiple pixel values generated for multiple corresponding sensor integration times. Thus, each of the aggregation registers 1330a-c is configured to store multiple pixel values corresponding to multiple frames. For example, the aggregation registers 1230a-c may be configured to load and store 10, 20, 30, 40, 50, 60, 70, 80, 90, 100 or any other suitable number of bits. Similarly, a bus (e.g., bus 130) may be configured with a width (e.g., number of parallel traces) corresponding to the size of the aggregation registers 1230a-c (e.g., 10, 20, 30, 40, 50, 60, 70, 80, 90, 100 traces) to enable parallel transfer of bits.

Multiplexers 1340a-c may be configured to select, based on control inputs 1370, between bit sequences of the corresponding pixel 1305a-c or bit sequences stored in aggregation registers of neighboring pixels. For example, multiplexer 1340a may select between a bit sequence corresponding to multiple values generated at the corresponding pixel 1305a or a bit sequence corresponding to multiple values stored in the aggregation register 1330b of the adjacent daisy-chained pixel 1305b. The values in the aggregation register 1330b may be generated at the pixel 1330b or any of the pixels following in the daisy chain (e.g., pixel 1305c).

Frame accumulation registers 1390a-c may be configured to store multiple values generated at the corresponding pixels 1305a-c during distinct integration times and/or corresponding to distinct frames. In some implementations, pixel aggregation circuits (e.g., circuits 128, 1228a-c) may include the frame accumulation registers 1390a-c. In other implementations, DCCs (e.g., circuits 126, 1226a-c) may include the frame accumulation registers 1390a-c.

The selection of the bit sequence at the multiplexers 1340a-c may be based on a rising edge (a transition from 0 to 1) of the substantially synchronized control inputs 1370. The control inputs 1370 may be frame set synchronization signals, causing the pixel aggregation registers 1330a-c to load, substantially simultaneously, the bit sequences corresponding to multiple frames from the accumulation registers 1390a-c.

The pixel aggregation registers 1330a-c and the pixel accumulation registers 1390a-c may be configured to store M-bit raw digital outputs of ADCs or N-bit compressed digital outputs of DCCs. The detector 100 may include, for example, a selection switch determining whether the digital processing unit 160 generates frames based on M-bit raw digital values or N-bit compressed values. For example, the ADCs 1224a-c may generate 14-bit raw digital values for each frame. The DCCs 1226a-c may be configured to either generate 9-bit (or other suitably compressed) compressed digital values or, simply, pass through the 14-bit raw digital values generated by the ADCs 1224a-c, based on the state of the selection switch. The pixel aggregation registers 1330a-c and the pixel accumulation registers 1390a-c may be configured to store 72 bits each. Consequently, each of the multi-value registers 1130a-c, 1390a-c may hold five 14-bit digital values (with 2 bits unused) or eight 9-bit digital values.

As with the pixels 1205a-c of FIG. 12, a shift clock signal may control the read-out rate of the pixels 1305a-c. For the example 256×256 size array with daisy-chained rows, a 100 MHz clock rate may yield, in the case of 72-bit pixel aggregation registers, a frame rate of 2.0 MHz if the frame includes raw (14-bit) values. The frame rate increases to 3.1 MHz if the frame includes compressed (9-bit) values. Conversely, a clock rate of 35 MHz may be sufficient to read out 256 columns of 9-bit compressed pixel values at a 1 MHz frame rate.

When the detector 100 is configured for parallel read-out of pixel values corresponding to multiple frames, the read-out time may be longer than the integration time. For example, to enable a 1 MHz frame rate, the detector 100 may be configured to compress pixel values to 9 bits and read out the array 101 using the set of busses 132, each 90-bit wide, over 10 μs. To ensure continuous read-out at the 1 MHz rate, average pixel integration time may be set to be no greater than 1 μs. Consequently, during a complete read-out of the array 101, the DCC 126 of the pixel 105 may generate ten 9-bit values. After each integration time, the accumulation register (e.g., registers 1390a-c) of the pixel 105, configured as a shift-register, may load the generated 9-bit value.

In some implementations, the width of pixel busses (e.g., bus 130) may be limited by chip or circuit real estate available at the pixels. In other implementations, constraints on the design of the digital processing unit 150 may limit the widths of the busses. Additionally or alternatively, the continuous frame rate may be limited by the bandwidth of the transmitter unit 170. In transmitter-bandwidth-limited implementations, rather than implementing a wider bus, pixel circuit real estate may be allocated to enable addition functionality.

Figure 14:
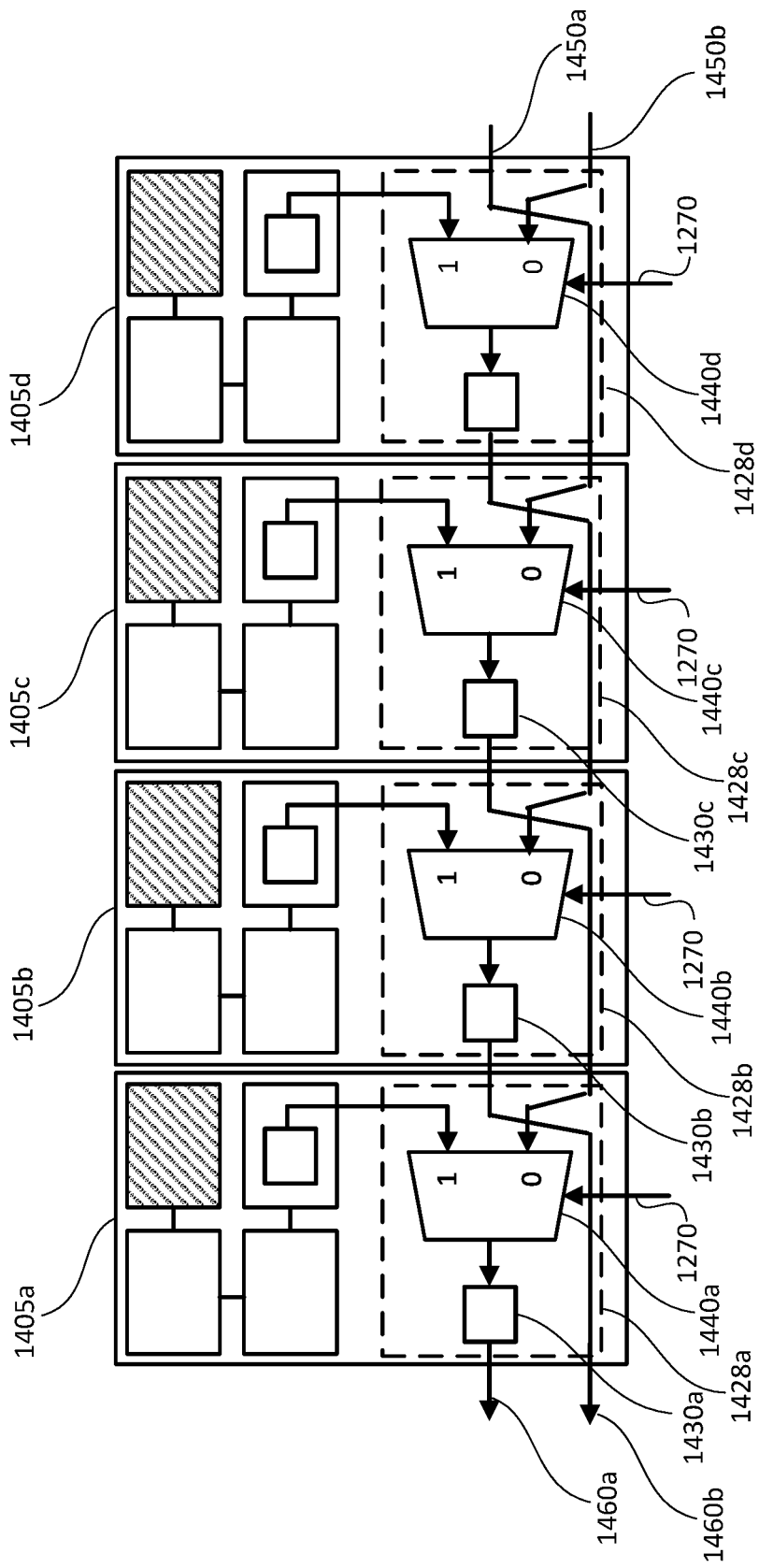
FIG. 14 schematically illustrates an implementation of pixel aggregation in which two busses along the same row of pixels transport, in parallel, pixel values from alternating pixels.

FIG. 14 illustrates an alternative implementation in which alternating pixels 1405a-d in a row of a detector array (e.g., array 101) are connected by two busses (e.g., bus 130). More specifically, pixel aggregation circuits 1428a,c may be connected by one pixel bus, while pixel aggregation circuits 1428b,d may be connected by a different pixel aggregation bus. During one clock cycle, multiplexers 1440a,b may select values stored, respectively, in aggregation registers 1430c,d and load aggregation registers 1430a,b. During the subsequent clock cycle, the values stored in the aggregation registers 1430a,b may propagate to another two registers (or to the digital processing unit 150, if pixel 1405a is the first column) via outputs 1460a,b). Similarly, during the same clock cycle, multiplexers 1440c,d, may load the registers 1430c,d via inputs 1450a,b. Using two, as opposed to a single serial bus, in a row of pixels may allow the pixels values to be collected by the digital processing unit 150 at twice the rate, or, conversely, at the same rate by half the clock frequency.

In a similar manner, a row (or a column, in some implementations) of pixels may be read out along four, six, eight or any other suitable number of parallel busses. Though using multiple busses in a single row may enable higher read-out rates, the parallel busses may require additional pixel real estate.

XII. Allocation of Areas for Pixel Circuits

Figure 15B:
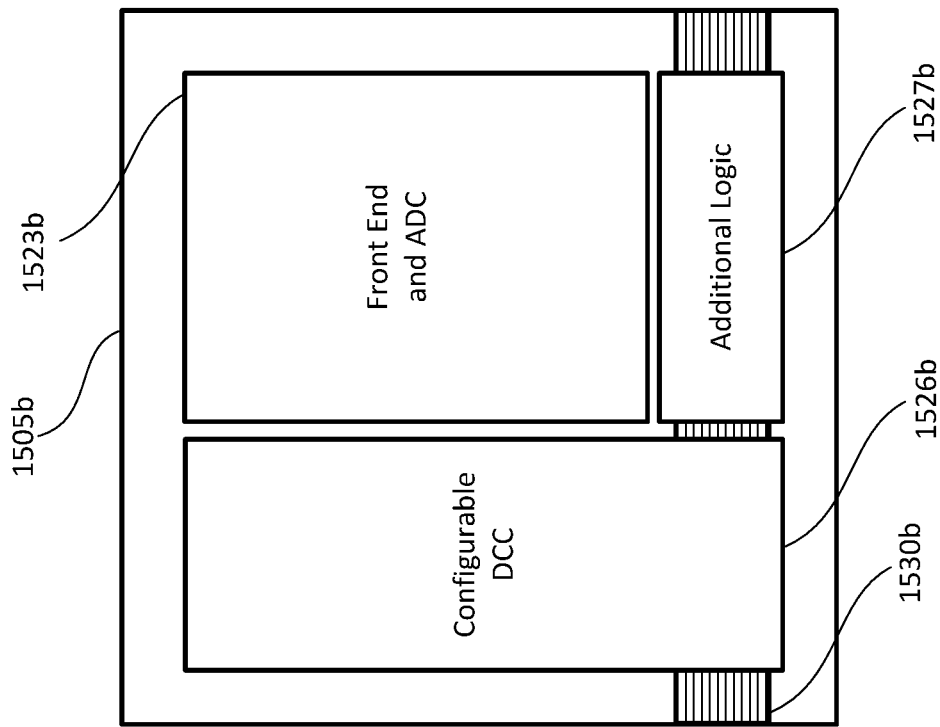
FIGS. 15A and 15B illustrate a pair of example uses of real estate in an application-specific integrated circuit (ASIC) implementation of pixel circuits.
Figure 15A:
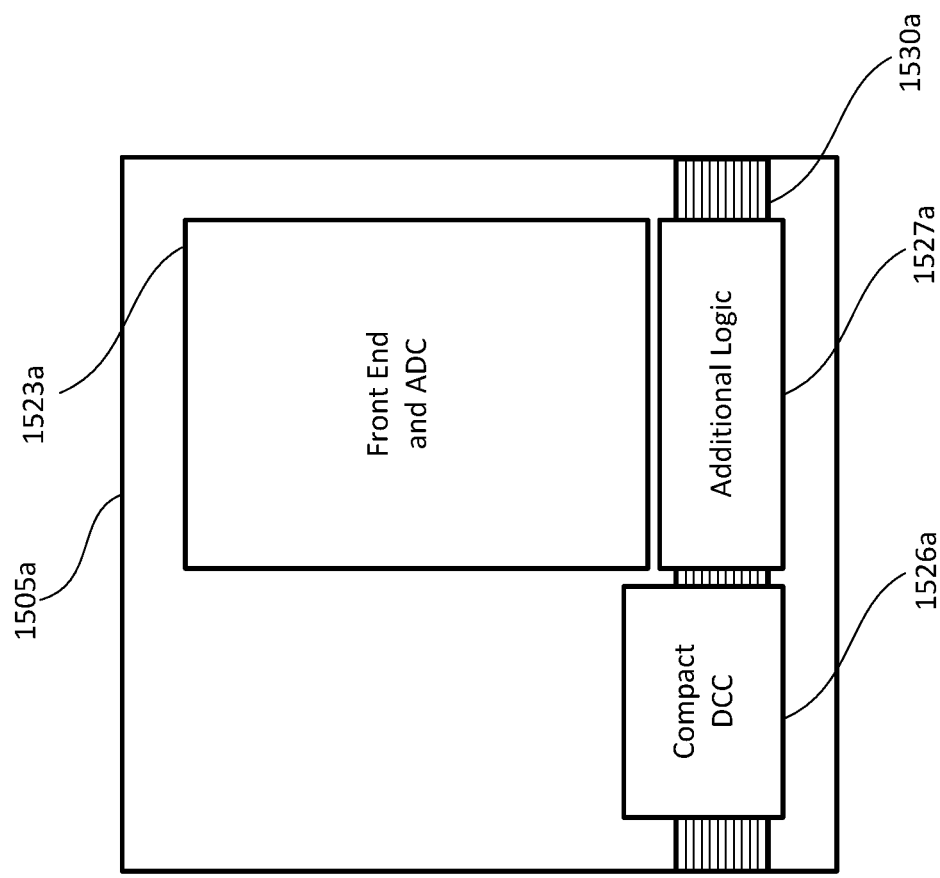

FIGS. 15A and 15B illustrate a pair of example uses of real estate in an ASIC implementation of pixel circuits (e.g., pixel circuit 120) for pixels 1505a,b. The example pixels 1505a,b may be implementations of pixels 105, 1105a-c, 1205a-c, 1305a-c, 1405a-d. The size of the pixels 1505a,b may be 115 µm by 115 µm, for example. In some implementations, pixel dimensions may range from a few tens of microns to several millimeters. Furthermore, the pixels need not be square—any suitable aspect ratio (e.g., 1, 2, 1.4, 2, etc.) may be implemented.

The pixels 1505a,b include integrated circuit (IC) combined implementations front end and ADC circuits 1523a,b, IC implementations of DCC circuits 1526a,b, and IC implementations of additional logic circuits 1527a,b. The additional logic circuits 1527a,b may include, for example, pixel aggregation circuits (e.g., circuit 128, multiplexers 1140a-c, 1240a-c, 1340a-c, and registers 1130, 1230a-c, 1330a-c, 1390a-c). In some implementations, the additional logic circuits 1527a,b may include logic for selecting among different compression options, memory for pixel noise thresholds, and/or other on-pixel functionality.

The pixels 1505a,b further include portions busses 1530a-b (e.g., bus 130) configured to connect multiple pixels for pixel value aggregation, as described above. The busses 1530a,b may connect pixels in the same row, or pixels in the same column, for example. In some implementations, pixels 1505a,b may include portions of multiple busses, e.g., one for aggregation along columns and another for aggregation along rows. The busses may be configured with multiple parallel traces (e.g., 8, 9, 10, 12, 14, 16, 18, 24, 48, 60, 72, 90, etc.) for parallel transfer of bits corresponding to one or more pixel values.

In some implementations, sensors (e.g., sensors 110, 1210a-c) of the pixels 1505a,b may be bonded and electrically connected with the respective circuits via solder bump arrays. In other implementations, sensors may be, at least in part, integrated on the same substrate with the pixel ASICs.

A portion of a 115 µm by 115 µm pixel area may be allocated for power connections (e.g., power rings). The power connections may be disposed along the perimeter (e.g., a 5-10 µm border). The remaining area of 100 µm by 100 µm in the middle may be allocated for pixel circuits implemented, for example, using 65 nm CMOS technology. In the illustrated pixels 1505a,b, a 65 µm by 90 µm area may be allocated for the analog front end and ADC circuits 1523a,b. A 65 µm by 10 µm area may be allocated for the additional logic circuits 1527a,b. The area allocated for DCCs 1526a,b may depend on the implementation of the DCC. A compact DCC 1526a implemented using power-of-2 division or bit shifting, as discussed with reference to FIGS. 3-5, may be implemented in a 35 µm by 25 µm. On the other hand, implementation based on an integer divider (e.g., divider 640) may use a 35 µm by 100 µm area, but offer the benefit of greater flexibility in implementing a mapping to encode the DCC output.

Multiple aspects of the devices and methods described in the disclosure are explicitly contemplated as described below.

Aspect 1. A detector for imaging and efficiently digitizing a spatial distribution of photon flux, the detector comprising: a plurality of pixel sensors, wherein each sensor is configured to generate an analog electrical signal indicative of a number of photons detected by the sensor during an integration time interval; a plurality of pixel circuits corresponding to the plurality of pixel sensors, wherein each pixel circuit includes: (i) an analog-to-digital converter (ADC) configured to generate an M-bit raw digital value based at least in part on the analog electrical signal generated by a corresponding pixel sensor, (ii) a digital compression circuit (DCC) configured to generate an N-bit compressed digital value, wherein N is smaller than M, based at least in part on the M-bit raw digital value; a digital processing unit configured to generate a set of frame data by collecting, from each pixel circuit of the plurality of pixel circuits in the detector, the compressed digital value; and one or more transmitters, configured to transmit the set of frame data from the detector within a time interval corresponding to a frame rate.

Aspect 2. The detector of aspect 1, further comprising a bus shared among two or more of the plurality of pixels, and wherein the pixel circuit of each of the two or more of the plurality of pixels further comprises a pixel aggregation circuit connected to the bus and including: an aggregation multiplexer configured to select a bit sequence between (i) a first bit sequence generated at the corresponding pixel, and (ii) a second bit sequence stored in the aggregation register of a proximal one of the two or more of the plurality of pixels; and an aggregation register configured to load and store the bit sequence selected by the aggregation multiplexer.

Aspect 3. The detector of aspect 2, wherein: the plurality of pixels form a rectangular array; and the two or more of the plurality of pixels are from a same column or a same row of the rectangular array.

Aspect 4. The detector of either one of the aspects 2 or 3, wherein: the first bit sequence includes multiple M-bit values or multiple N-bit values generated at the corresponding pixel; the second bit sequence includes multiple M-bit values or multiple N-bit values generated at another one of the one or more of the plurality of pixels; and the aggregation multiplexer selects and loads the first bit sequence or the second bit sequence into the aggregation register within a single clock cycle.

Aspect 5. The detector of any of the aspects 1-4, wherein the detector is a photon-counting detector.

Aspect 6. The detector of aspect 5, wherein the pixel circuit includes a primary counter and a secondary counter, and the secondary counter is configured to increment once for a plurality of increments of the primary counter, the plurality of increments determined based at least in part on the value of the primary counter.

Aspect 7. The detector of any of the aspects 1-4, wherein the detector is a charge-integrating detector.

Aspect 8. The detector of aspect 7, wherein the pixel circuit includes an analog front end configured to select a gain from a plurality of gains, and the ADC generates the M-bit raw digital value at least in part by including at least one bit indicative of the selected gain.

Aspect 9. The detector of any of the aspects 1-8, wherein the DCC is configured to: determine whether the M-bit digital value generated by the ADC indicates the detected number of photons below a threshold value, and set the N-bit digital value to zero in response to detecting that the M-bit raw digital value generated by the ADC indicates the detected number of photons below the threshold value.

Aspect 10. The detector of aspect 9, wherein the pixel circuit includes a memory configured to store a digital value indicative of the threshold value.

Aspect 11. The detector of any of the aspects 1-10, wherein the DCC includes: a range select circuit, configured to identify, from a plurality of non-overlapping ranges of possible M-bit digital values, a range corresponding to the M-bit raw digital value generated by the ADC; a mapping circuit, configured to generate a plurality of N-bit digital values corresponding to the plurality of non-overlapping ranges of possible M-bit digital values; and a selection circuit, configured to select, based on the range identified by the range-select circuit, the N-bit compressed digital value from the plurality of N-bit digital values generated by the mapping circuit.

Aspect 12. The detector of aspect 11, wherein: the mapping circuit is configured to generate the plurality of N-bit digital values concurrently, and the selection circuit includes a combinational logic circuit configured to select the N-bit compressed digital value from the plurality of N-bit digital values.

Aspect 13. The detector of aspect 11, wherein: the mapping circuit is configured to generate at least some values of the plurality of N-bit digital values sequentially, and the selection circuit includes a sequential logic circuit configured to select the N-bit compressed digital value from the plurality of N-bit digital values.

Aspect 14. The detector of any of the aspects 11-13, wherein: the mapping circuit implements a division by a power of two by transferring one or more bits of the M-bit raw digital value generated by the ADC to one of the plurality of N-bit digital values.

Aspect 15. The detector of any of the aspects 11-14, wherein the mapping circuit includes a digital divider.

Aspect 16. The detector of any of the aspects 1-13, wherein the DCC includes a digital divider with the divisor input based at least in part on the M-bit raw digital value generated by the ADC.

Aspect 17. The detector of either one of the aspects 15 or 16, wherein the divider is an integer divider.

Aspect 18. The detector of either one of the aspects 15 or 16, wherein the divider is a floating point divider.

Aspect 19. The detector of any of the aspects 1-18, wherein the DCC is configured to generate the N-bit compressed digital value at least in part by using a look-up table.

Aspect 20. The detector of any of the aspects 1-19, wherein the digital processing unit is further configured to generate another set of frame data by collecting, from each pixel circuit of the plurality of pixel circuits in the detector, the raw digital value.

Aspect 21. The detector of any of the aspects 1-20, further comprising a buffer memory configured to: store one or more sets of frame data for a storage time interval greater than the time interval corresponding to the frame rate, and provide the one or more sets of frame data to the transmitter after the expiration of the storage time interval.

Aspect 22. The detector of any of the aspects 1-21, wherein the detector is an X-ray detector.

Aspect 23. The detector of any of the aspects 1-22, wherein the plurality of pixel circuits is implemented on a single application-specific integrated circuit (ASIC).

Aspect 24. A method for imaging and efficiently digitizing a spatial distribution of photon flux using a plurality of pixels, the method comprising: generating, for each of the plurality of pixels, using a corresponding pixel sensor, an analog electrical signal indicative of a number of photons detected by the corresponding pixel sensor during an integration time interval; generating, for the each of the plurality of pixels, using a corresponding analog-to-digital converter (ADC), an M-bit raw digital value based at least in part on the analog electrical signal, generating, for the each of the plurality of pixels, using a corresponding digital compression circuit (DCC), an N-bit compressed digital value, wherein N is smaller than M, based at least in part on the M-bit raw digital value; generating, using a digital processing unit, a set of frame data by collecting, from the each of the plurality of pixels in the detector, the compressed digital value; and transmitting, using one or more transmitters, the set of frame data from the detector within a time interval corresponding to a frame rate.

Aspect 25. The method of aspect 24, wherein collecting, from the each of the plurality of pixels in the detector, the compressed digital value comprises: sharing among two or more of the plurality of pixels, a bus, and aggregating using a pixel aggregation circuit of the pixel circuit of at least one of the two or more of the plurality of pixels the compressed digital values of the two or more of the plurality of pixels at least in part by selecting, using an aggregation multiplexer, a bit sequence between (i) a first bit sequence generated at the corresponding pixel, and (ii) a second bit sequence stored in an aggregation register of a proximal one of the two or more of the plurality of pixels; and loading and storing the bit sequence selected by the aggregation multiplexer in an aggregation register of the at least one of the two or more of the plurality of pixels.

Aspect 26. The method of aspect 25, wherein: the plurality of pixels form a rectangular array; and the two or more of the plurality of pixels are from a same column or a same row of the rectangular array.

Aspect 27. The method of either one of the aspects 25 or 26, wherein: the first bit sequence includes multiple M-bit values or multiple N-bit values generated at the corresponding pixel; the second bit sequence includes multiple M-bit values or multiple N-bit values generated at another one of the one or more of the plurality of pixels; and the aggregation multiplexer selects and loads the first bit sequence or the second bit sequence into the aggregation register within a single clock cycle.

Aspect 28. The method of any of the aspects 24-27, wherein the detector is a photon-counting detector.

Aspect 29. The method of any of the aspects 24-27, wherein the detector is a charge-integrating detector.

Aspect 30. The method of aspect 29, wherein generating the analog signal includes selecting a gain from a plurality of gains in an analog front end configured to select a gain from a plurality of gains, and generating the M-bit raw digital value is at least in part by including at least one bit indicative of the selected gain.

Aspect 31. The method of any of the aspects 24-30, further comprising determining whether the M-bit digital value generated by the ADC indicates the detected number of photons below a threshold value, and setting the N-bit digital value to zero in response to determining that the M-bit raw digital value indicates the detected number of photons below the threshold value.

Aspect 32. The method of aspect 30, further comprising storing a digital value indicative of the threshold value in the pixel circuit.

Aspect 33. The method of any of the aspects 24-30, further comprising: identifying, using a range-select circuit, from a plurality of non-overlapping ranges of possible M-bit digital values, a range corresponding to the M-bit raw digital value generated by the ADC; generating, using a mapping circuit, a plurality of N-bit digital values corresponding to the plurality of non-overlapping ranges of possible M-bit digital values; and selecting, using a selection circuit, based on the range identified by the range-select circuit, the N-bit compressed digital value from the plurality of N-bit digital values generated by the mapping circuit.

Aspect 34. The method of aspect 33, wherein: the mapping circuit is configured to generate the plurality of N-bit digital values concurrently, and the selection circuit includes a combinational logic circuit configured to select the N-bit compressed digital value from the plurality of N-bit digital values.

Aspect 35. The method of aspect 33, wherein: the mapping circuit is configured to generate at least some values of the plurality of N-bit digital values sequentially, and the selection circuit includes a sequential logic circuit configured to select the N-bit compressed digital value from the plurality of N-bit digital values.

Aspect 36. The method of any of the aspects 33-35, wherein: the mapping circuit implements a division by a power of two by transferring one or more bits of the M-bit raw digital value generated by the ADC to one of the plurality of N-bit digital values.

Aspect 37. The method of any of the aspects 33-36, wherein the mapping circuit implements division using a digital divider.

Aspect 38. The method of any of the aspects 24-35, wherein the DCC includes a digital divider with a divisor input based at least in part on the M-bit raw digital value generated by the ADC.

Aspect 39. The method of any of the aspects 24-38, wherein generating the N-bit compressed digital value includes using a look-up table.

Aspect 40. The method of any of the aspects 24-39, further comprising generating another set of frame data by collecting, from each pixel circuit of the plurality of pixel circuits in the detector, the raw digital value.

Aspect 41. The method of any of the aspects 24-40, further comprising: storing, using a buffer memory, one or more sets of frame data for a storage time interval greater than the time interval corresponding to the frame rate, and provide the one or more sets of frame data to the transmitter after the expiration of the storage time interval.

Aspect 42. The method of any of the aspects 24-41, wherein the detector is an X-ray detector.

Aspect 43. The method of any of the aspects 24-42, wherein the plurality of pixel circuits is implemented on a single application-specific integrated circuit (ASIC).

Aspect 44. The method of any of the aspects 24-43, wherein generating the N-bit digital value introduces quantization noise no greater than Poisson noise associated with the number of photons detected by the corresponding pixel sensor.

What is claimed is:

1. A detector for imaging and efficiently digitizing a spatial distribution of photon flux, the detector comprising:
   a plurality of pixel sensors, wherein each sensor is configured to generate an analog electrical signal indicative of a number of photons detected by the sensor during an integration time interval;
   a plurality of pixel circuits corresponding to the plurality of pixel sensors, wherein each pixel circuit corresponds to a single pixel in the detector and includes:
      an analog-to-digital converter (ADC) configured to generate an M-bit raw digital value based at least in part on the analog electrical signal generated by a corresponding pixel sensor,
      a digital compression circuit (DCC) configured to:
         (i) generate an N-bit compressed digital value, wherein N is smaller than M, based at least in part on the M-bit raw digital value,
         (ii) determine whether the M-bit digital value generated by the ADC indicates the detected number of photons below a threshold value, and
         (iii) set the N-bit digital value to zero in response to detecting that the M-bit raw digital value generated by the ADC indicates the detected number of photons below the threshold value;
   a digital processing unit configured to generate a set of frame data by collecting, from each pixel circuit of the plurality of pixel circuits in the detector, the compressed digital value; and
   one or more transmitters, configured to transmit the set of frame data from the detector within a time interval corresponding to a frame rate.

2. The detector of claim 1, wherein the DCC includes:
   a range select circuit, configured to identify, from a plurality of non-overlapping ranges of possible M-bit digital values, a range corresponding to the M-bit raw digital value generated by the ADC,
   a mapping circuit, configured to generate a plurality of N-bit digital values corresponding to the plurality of non-overlapping ranges of possible M-bit digital values, and
   a selection circuit, configured to select, based on the range identified by the range-select circuit, the N-bit compressed digital value from the plurality of N-bit digital values generated by the mapping circuit.

3. The detector of claim 2, wherein:
the mapping circuit is configured to generate the plurality of N-bit digital values concurrently, and
the selection circuit includes a combinational logic circuit configured to select the N-bit compressed digital value from the plurality of N-bit digital values.

4. The detector of claim 2, wherein:
the mapping circuit is configured to generate at least some values of the plurality of N-bit digital values sequentially, and
the selection circuit includes a sequential logic circuit configured to select the N-bit compressed digital value from the plurality of N-bit digital values.

5. The detector of claim 2, wherein:
the mapping circuit implements a division by a power of two by transferring one or more bits of the M-bit raw digital value generated by the ADC to one of the plurality of N-bit digital values.

6. The detector of claim 2, wherein:
the mapping circuit includes a digital divider.

7. The detector of claim 1, further comprising a bus shared among two or more of the plurality of pixels, and wherein, for each of the two or more of the plurality of pixels, a corresponding one of the plurality of pixel circuits further comprises a pixel aggregation circuit connected to the bus and including:
an aggregation multiplexer configured to select a bit sequence between: i) a first bit sequence generated at the corresponding pixel, and ii) a second bit sequence stored at a proximal one of the two or more of the plurality of pixels; and
an aggregation register configured to load and store the bit sequence selected by the aggregation multiplexer.

8. The detector of claim 7, wherein:
the plurality of pixels form a rectangular array; and
the two or more of the plurality of pixels are from a same column or a same row of the rectangular array.

9. The detector of claim 7, wherein:
the first bit sequence includes multiple M-bit values or multiple N-bit values generated at the corresponding pixel,
the second bit sequence includes multiple M-bit values or multiple N-bit values generated at another one of the one or more of the plurality of pixels, and
the aggregation multiplexer selects and loads the first bit sequence or the second bit sequence into the aggregation register within a single clock cycle.

10. The detector of claim 8, wherein the pixel circuit includes a memory configured to store a digital value indicative of the threshold value.

11. The detector of claim 1, wherein the detector is a photon-counting detector.

12. The detector of claim 1, wherein the detector is a charge-integrating detector.

13. The detector of claim 12, wherein:
the pixel circuit includes an analog front end configured to select a gain from a plurality of gains, and
the ADC generates the M-bit raw digital value at least in part by including at least one bit indicative of the selected gain.

14. The detector of claim 1, wherein:
the DCC includes a digital divider with the divisor input based at least in part on the M-bit raw digital value generated by the ADC.

15. The detector of claim 1, wherein:
the DCC is configured to generate the N-bit compressed digital value using a look-up table.

16. The detector of claim 1, wherein the digital processing unit is further configured to generate another set of frame data by collecting, from each pixel circuit of the plurality of pixel circuits in the detector, the raw digital value.

17. The detector of claim 1, wherein the detector is an X-ray detector.

18. The detector of claim 1, wherein the plurality of pixel circuits is implemented on a single application-specific integrated circuit (ASIC).

19. A method for imaging and efficiently digitizing a spatial distribution of photon flux using a plurality of pixels, the method comprising:
generating, for each of the plurality of pixels, using a corresponding pixel sensor, an analog electrical signal indicative of a number of photons detected by the corresponding pixel sensor during an integration time interval;
generating, using a different corresponding analog-to-digital converter (ADC) for each of the plurality of pixels, an M-bit raw digital value based at least in part on the analog electrical signal,
generating, using a different corresponding digital compression circuit (DCC) for each of the plurality of pixels, an N-bit compressed digital value, wherein N is smaller than M, based at least in part on the M-bit raw digital value, wherein each DCC is configured to:
determine whether the M-bit digital value generated by the ADC indicates the detected number of photons below a threshold value, and
set the N-bit digital value to zero in response to detecting that the M-bit raw digital value generated by the ADC indicates the detected number of photons below the threshold value;
generating, using a digital processing unit, a set of frame data by collecting, from the each of the plurality of pixels in the detector, the compressed digital value; and
transmitting, using one or more transmitters, the set of frame data from the detector within a time interval corresponding to a frame rate.

\* \* \* \* \*